United States Patent
Sytnik et al.

(10) Patent No.: US 11,657,481 B2
(45) Date of Patent: May 23, 2023

(54) SYSTEMS AND METHODS FOR SELECTIVE ENHANCEMENT OF SKIN FEATURES IN IMAGES

(71) Applicant: Shinyfields Limited, Nicosia (CY)

(72) Inventors: Dmitry Sytnik, Kyiv (UA); Andrey Frolov, Kyiv Oblast (UA)

(73) Assignee: Shinyfields Limited, Nicosia (CY)

( * ) Notice: Subject to any disclaimer, the term of this patent is extended or adjusted under 35 U.S.C. 154(b) by 240 days.

(21) Appl. No.: 16/951,929

(22) Filed: Nov. 18, 2020

(65) Prior Publication Data

US 2021/0150677 A1 May 20, 2021

Related U.S. Application Data

(60) Provisional application No. 62/936,862, filed on Nov. 18, 2019.

(51) Int. Cl.
*G06T 5/00* (2006.01)
*G06T 7/00* (2017.01)
*G06T 5/50* (2006.01)

(52) U.S. Cl.
CPC ............... *G06T 5/005* (2013.01); *G06T 5/002* (2013.01); *G06T 5/50* (2013.01); *G06T 7/0012* (2013.01);
(Continued)

(58) Field of Classification Search
CPC ........... G06T 5/005; G06T 5/002; G06T 5/50; G06T 7/0012; G06T 2207/20084;
(Continued)

(56) References Cited

U.S. PATENT DOCUMENTS

| 8,345,114 B2* | 1/2013 | Ciuc | G06T 11/60 |
| | | | 348/222.1 |
| 10,936,583 B2* | 3/2021 | Venkataraman | H04N 21/4828 |

(Continued)

FOREIGN PATENT DOCUMENTS

| CA | 2618519 A1 * | 2/2007 | ............ A45D 40/30 |
| WO | WO-2014176425 A1 * | 10/2014 | ............ C12Q 1/6876 |
| WO | WO-2017083576 A1 * | 5/2017 | ............ C12Q 1/6883 |

OTHER PUBLICATIONS

"Dilation (morphology)", Wikipedia entry, archived Oct. 2, 2019: https://web.archive.org/web/20191002155651/https://en.wikipedia.org/wiki/Dilation_(morphology).
(Continued)

*Primary Examiner* — Jose L Couso
(74) *Attorney, Agent, or Firm* — Brown Rudnick LLP

(57) ABSTRACT

Exemplary embodiments are directed to a system for selective enhancement of skin features in an image. The system includes an interface configured to receive as input an original image, and a processing device in communication with the interface. The processing device is configured to process the original image using a neural network to detect one or more skin imperfections in the original image, generate a neural network mask of the original image for the one or more skin imperfections in the original image, generate one or more source patches based on the original image, and, replace the one or more skin imperfections in the original image with the one or more source patches to generate a patched skin image.

16 Claims, 26 Drawing Sheets
(19 of 26 Drawing Sheet(s) Filed in Color)

(52) U.S. Cl.
CPC ............... *G06T 2207/20084* (2013.01); *G06T 2207/20221* (2013.01); *G06T 2207/30088* (2013.01); *G06T 2207/30201* (2013.01)

(58) Field of Classification Search
CPC . G06T 2207/20221; G06T 2207/30088; G06T 2207/30201; G06T 5/008; G06T 5/20; G06T 2207/10024; G06T 2207/20076; G06T 2207/20081; G06T 7/11; G06T 11/60; G06T 3/4046; G06T 9/002; G06V 40/10; G06V 40/171; G06V 10/454; G06V 10/82; G06V 30/18057; G06K 9/6255; G06K 7/1482; A61B 5/0077; A61B 5/441; A61B 5/7267; G06N 3/02; G06N 3/08–088; G06N 3/0454; G06N 7/00; G06N 20/00

See application file for complete search history.

(56) References Cited

U.S. PATENT DOCUMENTS

| | | | |
|---|---|---|---|
| 2014/0010448 A1* | 1/2014 | Lischinski | G06T 5/008 382/167 |
| 2015/0086104 A1* | 3/2015 | Miyamoto | C12Q 1/68 382/133 |
| 2017/0270593 A1* | 9/2017 | Sherman | G06K 9/627 |
| 2017/0287134 A1* | 10/2017 | Abedini | G06T 7/187 |
| 2018/0350071 A1* | 12/2018 | Purwar | G06V 10/25 |
| 2019/0213452 A1* | 7/2019 | Ludwinski | G06V 30/194 |
| 2019/0251674 A1* | 8/2019 | Chang | G06T 5/007 |
| 2020/0170564 A1* | 6/2020 | Jiang | A61B 5/7267 |
| 2021/0012493 A1* | 1/2021 | Jiang | A61B 5/0022 |

OTHER PUBLICATIONS

"Graph Transform Tool", GitHub Tensorflow Tools README file, archived Nov. 4, 2018: https://web.archive.org/web/20181104111318/ https://github.com/tensorflow/tensorflow/blob/master/tensorflow/ tools/graph_transforms/README.md.

Chen et al., "Encoder-Decoder with Atrous Separable Convolution for Semantic Image Segmentation", in Lecture Notes in Computer Science: Computer Vision—ECCV 2018, pp. 833-851.

Farbman et al., "Coordinates for Instant Image Cloning", in SIGGRAPH '09: ACM SIGGRAPH 2009 papers, Jul. 2009, Article No. 67, pp. 1-9.

He et al., "Guided Image Filtering", Proceedings of the European Conference on Computer Vision (ECCV) 2010, pp. 1-14.

He et al., "Guided Image Filtering", IEEE Transactions On Pattern Analysis And Machine Intelligence (vol. 35, Issue: 6, Jun. 2013), pp. 1397-1409.

Paris et al., "Local Laplacian Filters: Edge-aware Image Processing with a Laplacian Pyramid", ACM Transactions on Graphics (Proceedings of SIGGRAPH 2011), Communications of the ACM (Mar. 2015, vol. 58, No. 3).

Sandler et al., "MobileNetV2: Inverted Residuals and Linear Bottlenecks", Proceedings of the IEEE Conference on Computer Vision and Pattern Recognition (CVPR) 2018, pp. 4510-4520.

* cited by examiner

SYSTEMS AND METHODS FOR SELECTIVE ENHANCEMENT OF SKIN FEATURES IN IMAGES

CROSS-REFERENCE TO RELATED APPLICATIONS

The present application claims the benefit of priority to U.S. Provisional Application No. 62/936,862, filed Nov. 18, 2019, which is hereby incorporated by reference in its entirety.

TECHNICAL FIELD

The present disclosure relates generally to computer-based systems and methods for altering or editing digital images. More specifically, the present disclosure relates to systems and methods for selective enhancement of skin features in images, in order to generate a realistic and improved image in an efficient manner.

BACKGROUND

Although make-up can be used to hide blemishes prior to capturing a photograph or image of an individual, such make-up may not always be available and/or it may be desirable to retouch one or more skin features associated with the individual after the photograph has been captured. In some instances, skin retouching can be a key to obtaining high-quality portrait shots, and is a process performed often by those who edit photographs. The retouching process is generally not automatic, and instead often requires a wide range of image editing tools to achieve the desired result. For example, traditional systems may necessitate a slow and complicated process in manual mode for the allocation and elimination of each skin imperfection.

For traditional systems that provide an automated retouching process, such systems typically necessitate human intervention, generally provide a lower quality level of the output image (e.g., unrealistic retouching), and apply retouching to the entire image (not only the skin features), thereby affecting the quality of the surrounding features. Depending on the scene in the image, different approaches may be needed to apply skin retouching for each scene without a uniform enhancement capable of being used for different images. In addition, traditional software may necessitate advanced skills to properly allocate and eliminate/enhance skin imperfections, with lower skill levels resulting in unrealistic skin. For example, smoothing the skin of an individual can result in pores being erased, resulting in an unrealistic image.

A need exists for systems and methods for selective enhancement of skin features in images that allow for an automatic and efficient process of enhancement of the skin features in images having varying complexities. The systems and methods of the present disclosure solve these and other needs.

SUMMARY

In accordance with embodiments of the present disclosure, an exemplary system for selective enhancement of skin features in an image is provided. The system includes an interface configured to receive as input an original image, and a processing device in communication with the interface. The processing device can be configured to process the original image using a neural network to detect one or more skin imperfections in the original image, and generate a neural network mask of the original image for the one or more skin imperfections in the original image. The processing device can be configured to generate one or more source patches based on the original image, and replace the one or more skin imperfections in the original image with the one or more source patches to generate a patched skin image.

The original image can include at least one individual with the one or more skin imperfections on a face of the individual. The processing device can generate a bounding box around detected skin features in the original image for enhancement, the skin features including the one or more skin imperfections. The processing device can generate a separate bounding box for each individual depicted in the original image. The neural network mask can be a skin imperfections mask, the skin imperfections mask including an island disposed over and associated with each of the one or more skin imperfections. The processing device can generate a defect area independently surrounding each of the one or more skin imperfections. The processing device can select one of the one or more source patches for replacement of one of the one or more skin imperfections based on at least a partial overlap between the defect area and the source patch. The processing device can generate a masked skin image including a skin mask. The skin mask can encompass skin within the patched skin image and excludes facial feature details from the skin mask. The facial feature details can include at least one of eyebrows, hair, nose, or lips.

The processing device can generate a blurred image, the blurred image including blurring of the skin encompassed by the skin mask without affecting facial feature details. The processing device can generate a detail image, the detail image including facial feature details excluded from the skin mask. The processing device can generate two or more filtered images. The two or more filtered images can include the facial feature details at different kernel sizes. The different kernel sizes can be small kernels, medium kernels, and big kernels. The processing device can generate a combined image, the combined image including the facial feature details of the small kernels and including only some of the facial feature details of the medium and big kernels. The processing device can generate a dark circle mask for shadowed features under eyes of the individual. The processing device can generate a noise image. The noise image can include a noise effect applied to skin of an individual with the one or more skin imperfections.

In some embodiments, the interface can include an image selection section with the patched skin image and one or more additional original images. In some embodiments, the interface can include a first submenu for selecting the patched skin image and copying one or more enhancements applied to the patched skin image. The interface can include a second submenu for selecting one or more of the additional original images and applying the copied one or more enhancements of the patched skin image to the selected one or more of the additional original images.

In accordance with embodiments of the present disclosure, an exemplary method for selective enhancement of skin features in an image is provided. The method can include receiving as input at an interface an original image, detecting one or more skin imperfections in the original image with a neural network, and generating a neural network mask of the original image for the one or more skin imperfections in the original image. The method can include generating one or more source patches based on the original image, and replacing the one or more skin imperfections in the original image with the one or more source patches to generate a patched skin image.

In accordance with embodiments of the present disclosure, an exemplary non-transitory computer-readable medium storing instructions at least for selective enhancement of skin features in an image is provided. The instructions are executable by a processing device. Execution of the instructions by the processing device can cause the processing device to receive as input at an interface an original image, detect one or more skin imperfections in the original image with a neural network, and generate a neural network mask of the original image for the one or more skin imperfections in the original image. Execution of the instructions by the processing device can cause the processing device to generate one or more source patches based on the original image, and replace the one or more skin imperfections in the original image with the one or more source patches to generate a patched skin image.

Other features and advantages will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To assist those of skill in the art in making and using the disclosed systems and methods for selective enhancement of skin features in images, reference is made to the accompanying figures, wherein.

DETAILED DESCRIPTION

In accordance with embodiments of the present disclosure, exemplary systems for selective enhancement of skin features in images are provided to generate an improved and realistic output image. The systems can generate a neural network mask (e.g., a skin mask) using a neural network to identify and segment the skin features from the original image. The neural network mask allows for enhancement of the skin features of the individual in the image independently from other features in the original image (e.g., without affecting the other features in the original image). The systems can be used to automatically provide high-quality retouching or enhancement of people's skin in various orientations, with different lighting, and/or with different skin tones.

In some embodiments, the systems can be used to remove acne, skin dots, moles, wrinkles, and other skin imperfections. In some embodiments, the systems can be used to smooth the skin and remove stains and/or bumps in the skin. In some embodiments, the systems can perform these enhancement techniques in two or more separate steps. For example, the systems can remove acne, skin dots and other skin imperfections in a first step with one or more enhancements, and smooth the skin and remove stains and/or bumps in the skin in a second step with one or more enhancements. The quality of the enhancements can be equal to or better in quality as compared to professional manual photograph editing and the time for performing the enhancements can be real-time (or substantially real-time), thereby providing an efficient and cost effective system for editing images.

Figure 1:
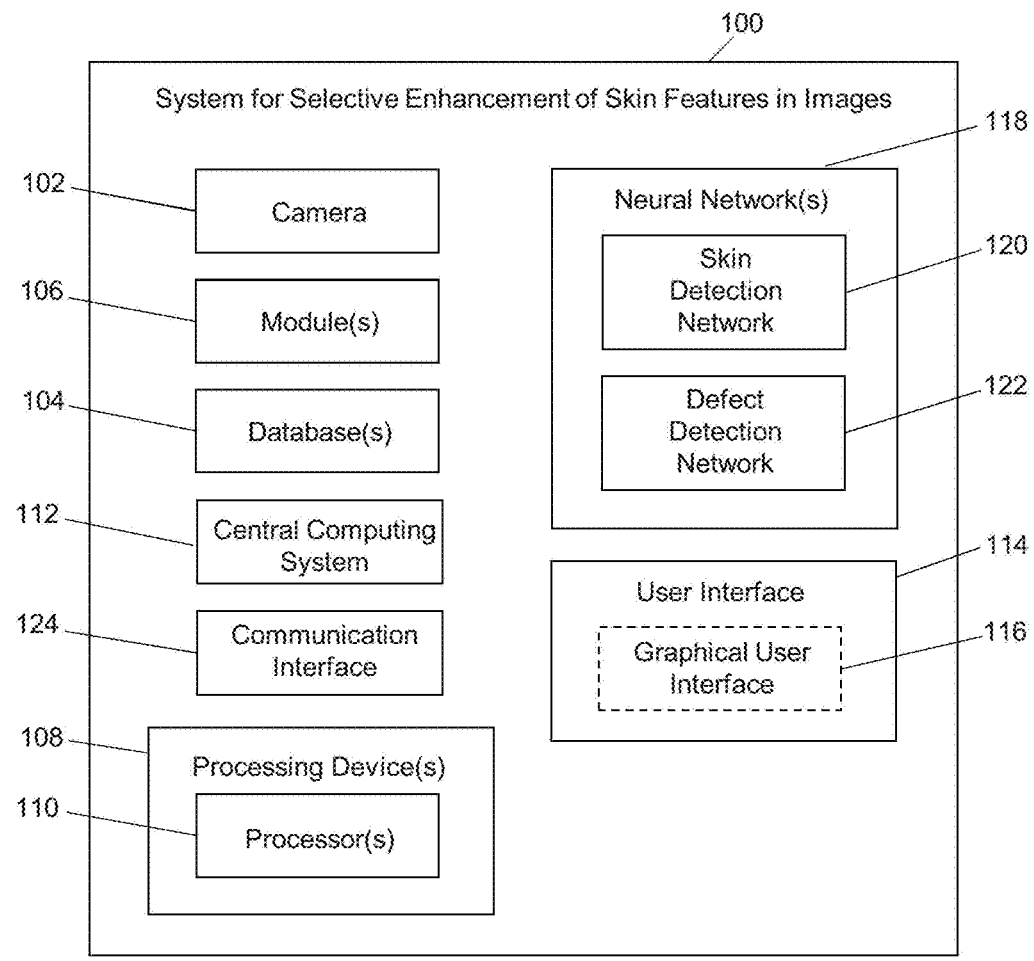
FIG. 1 is a block diagram of an exemplary system for selective enhancement of skin features in images in accordance with the present disclosure.

FIG. 1 is a block diagram of an exemplary system 100 for selective enhancement of skin features in images (hereinafter "system 100"). The system 100 includes one or more cameras 102 capable of capturing one or more digital images that can be received as input images by the system 100. The system 100 includes one or more databases 104 configured to receive and electronically store data corresponding to operation of the system 100, including data corresponding to images received, edited and/or enhanced by the system 100. The system 100 includes software units or modules 106 configured to be executed by a processing device 108 to edit, adjust and/or enhance one or more skin features of the input images. The processing device 108 can include one or more processors 110 for executing the modules 106.

The system 100 can include a central computing system 112 for controlling the steps performed by the system 100. In some embodiments, the central computing system 112 can include the one or more processing devices 108. The system 100 can include a user interface 114 (e.g., a device with a user interface), such as a user interface having a graphical user interface (GUI) 116. The GUI 116 can be used to input data and/or instructions into the system 100, and to output data and/or images to the user.

The system 100 can include one or more neural networks 118 executed by the processing device 108. The neural network 118 can include a skin detection network 120 (e.g., a skin segmentation network) and a defect detection network 122. The network 118 can be trained via, e.g., manual input, machine learning, historical data input and analysis, combinations thereof, or the like, with sample images to assist in one or more steps of the process performed by the system 100. For example, the network 118 can be trained with sample images to detect and segment, e.g., human faces in the input images, skin features in the input images, combinations thereof, or the like. Although discussed herein as detecting and segmenting human faces, it should be understood that the system 100 can be used to detect and segment human skin in any part of the body. In one embodiment, the network 118 can be trained to recognize pixels in the input image that correspond with human skin (or with a high probability of corresponding with human skin). The networks 118 used can be small and fast to ensure efficient processing of the images within the system 100. The skin detection network 120 can precisely identify and segment objects (e.g., the skin features) from the original image and can use quantization weights to reduce the size of the network.

In some embodiments, the skin detection network 120 can be used to identify and segment the skin features to be enhanced in the original image. The defect detection network 122 can include a dataset with a large number of defects to identify and segment specific types of skin defects in the original image to ensure a realistic overall adjustment to the original image. The system 100 can include a communication interface 124 configured to provide communication and/or transmission of data between the components of the system 100 shown in FIG. 1.

Figure 2:
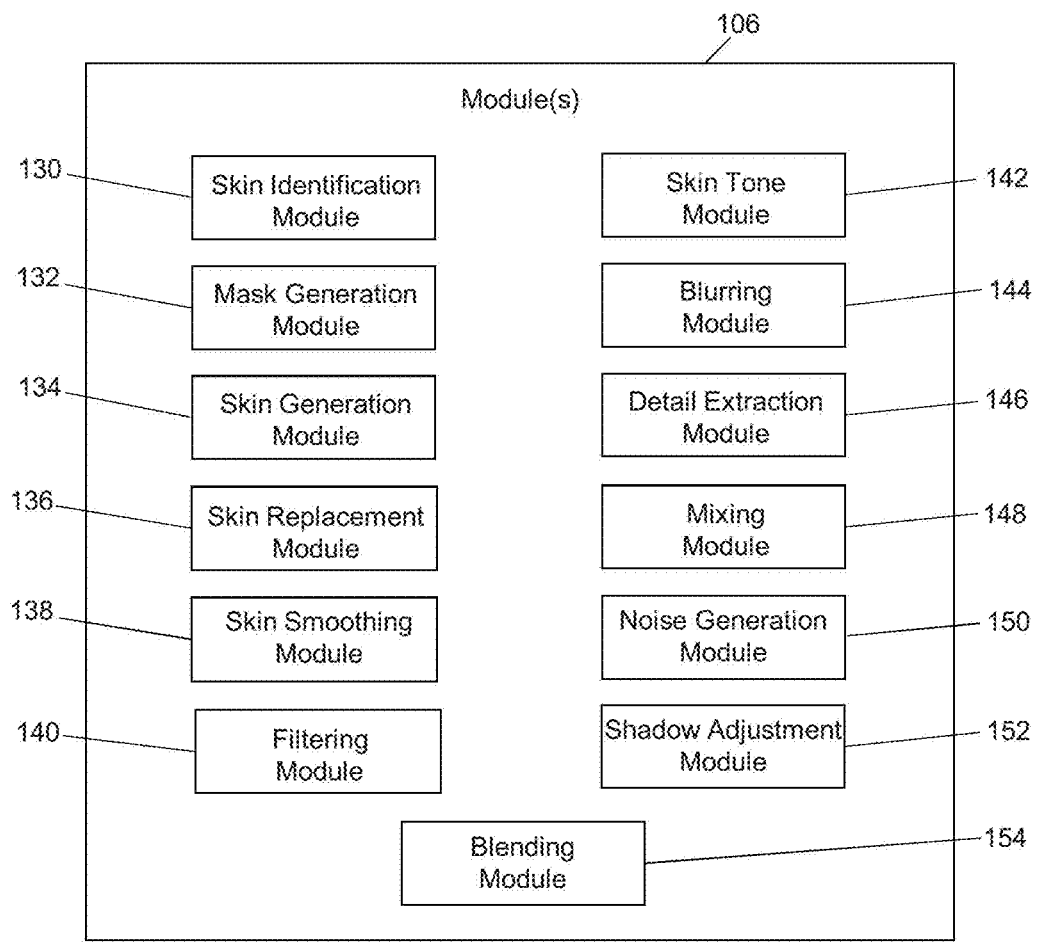
FIG. 2 is a block diagram of exemplary modules of a system for selective enhancement of skin features in images in accordance with the present disclosure.

FIG. 2 is a block diagram illustrating the software modules 106 of the system 100 in greater detail. Although illustrated as separate modules, in some embodiments, the modules can be combined or separated into one or more modules. For example, the modules can be combined into a single module and/or any of the modules can be distributed in the system 100. In some embodiments, the system 100 can include, e.g., skin identification module 130, a mask generation module 132, a skin generation module 134, a skin replacement module 136, a skin smoothing module 138, a filtering module 140, a skin tone module 142, a blurring module 144, a detail extraction module 146, a mixing module 148, a noise generation module 150, a shadow adjustment module 152, and a blending module 154. Execution and operation of each of the modules 106 will be discussed in detail below with reference to sample images.

Figure 3:
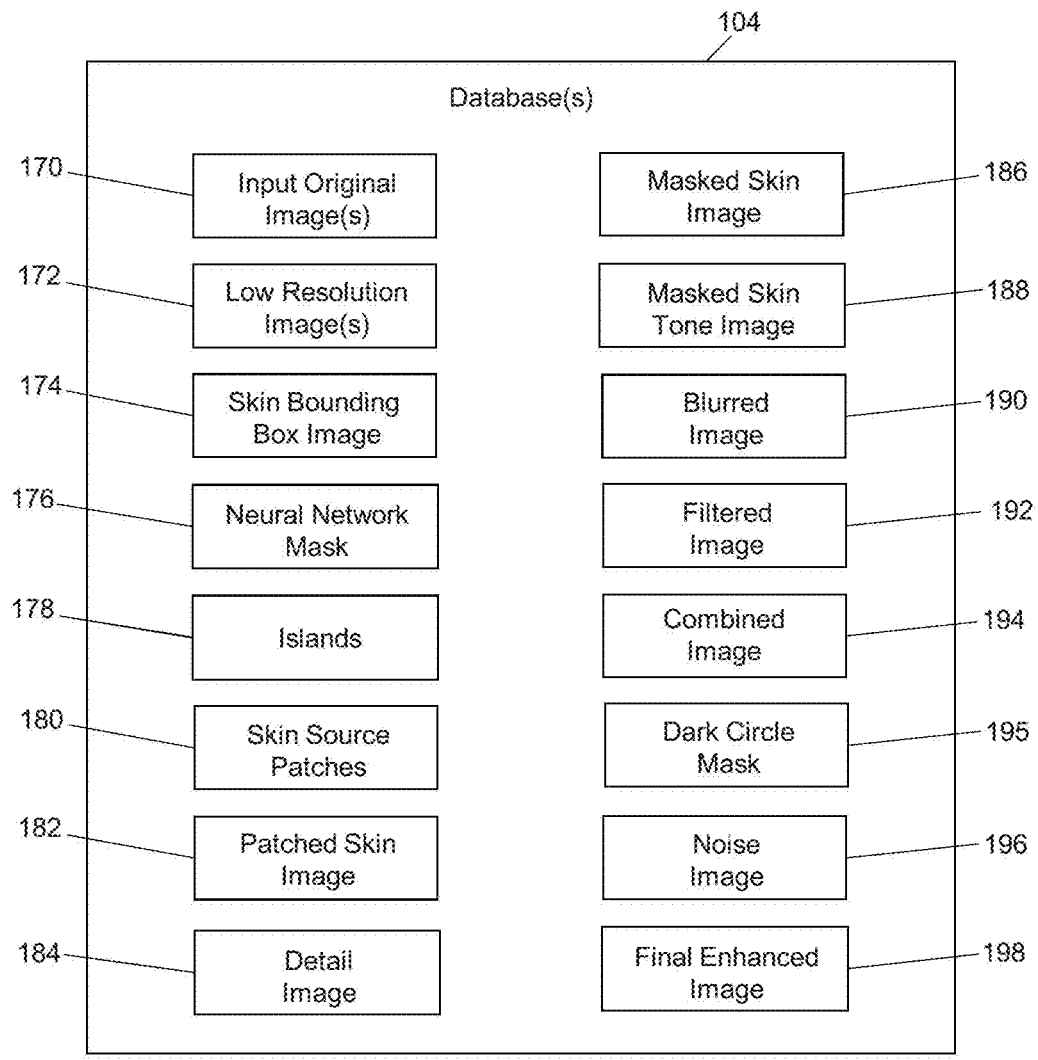
FIG. 3 is a block diagram of an exemplary database of a system for selective enhancement of skin features in images in accordance with the present disclosure.

FIG. 3 is a block diagram illustrating the database 104 of the system 100 in greater detail. The database 104 can electronically receive and/or store data corresponding to, e.g., input original images 170, low resolution images 172, skin/face bounding boxes 174, neural network masks 176, islands 178, skin source patches 180, patched skin images 182, detail images 184, masked skin images 186, masked skin tone images 188, blurred images 190, filtered images 192, combined images 194, dark circle masks 195, noise images 196, and final enhanced images 198. The data electronically received and/or stored in the database 104 will be discussed in detail below with reference to sample images and the modules 106 of FIG. 2.

Figure 4:
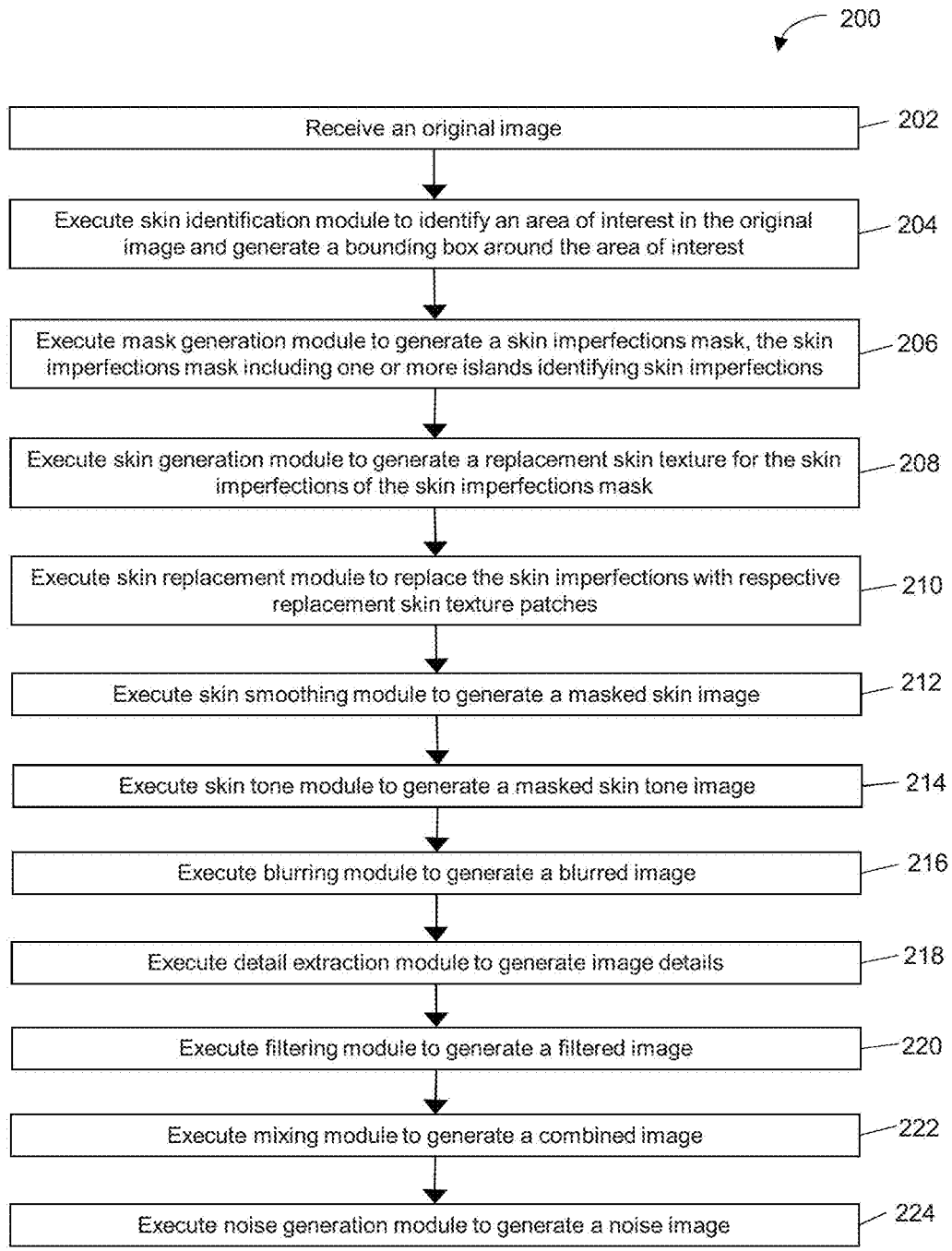
FIG. 4 is a flowchart illustrating an exemplary process of implementing a system for selective enhancement of skin features in images in accordance with the present disclosure.

FIG. 4 is a flowchart 200 illustrating overall process steps executed by the system 100. To begin at step 202, an original image is received by the system, the original image including a human with one or more skin features. At step 204, the skin identification module can be executed by the processing device to identify an area of interest in the original image and generate a bounding box around the area of interest. At step 206, the mask generation module can be executed by the processing device to generate a skin imperfections mask (e.g., a neural network mask), the skin imperfections mask including one or more islands identifying skin imperfections. At step 208, the skin generation module can be executed by the processing device to generate a replacement skin texture for the skin imperfections of the skin imperfections mask. At step 210, the skin replacement module can be executed by the processing device to replace the skin imperfections with respective replacement skin texture patches.

At step 212, the skin smoothing module can be executed by the processing device to generate a masked skin image. At step 214, the skin tone module can be executed by the processing device to generate a masked skin tone image. At step 216, the blurring module can be executed by the processing device to generate a blurred image. At step 218, the detail extraction module can be executed by the processing device to generate image details. At step 220, the filtering module can be executed by the processing device to generate a filtered image. At step 222, the mixing module can be executed by the processing device to generate a combined image. At step 224, the noise generation module can be executed by the processing device to generate a noise image. Details of the process 200 and additional optional steps will be discussed in greater detail below in combination with the sample images. It should be understood that the strength or intensity of the enhancements or adjustments applied to the original image can be set by a transparency value associated with the effect. In some embodiments, the transparency value can be, e.g., automatically determined and set by the system 100, manually set or adjusted by the user, combinations thereof, or the like. The transparency value can be a range of 0% to 100%, with 0% representing no transparency and 100% representing complete transparency. Adjustment of the transparency value can weaken or strengthen the effect of the enhancements applied to the original image to ensure a realistic output image.

Figure 5:
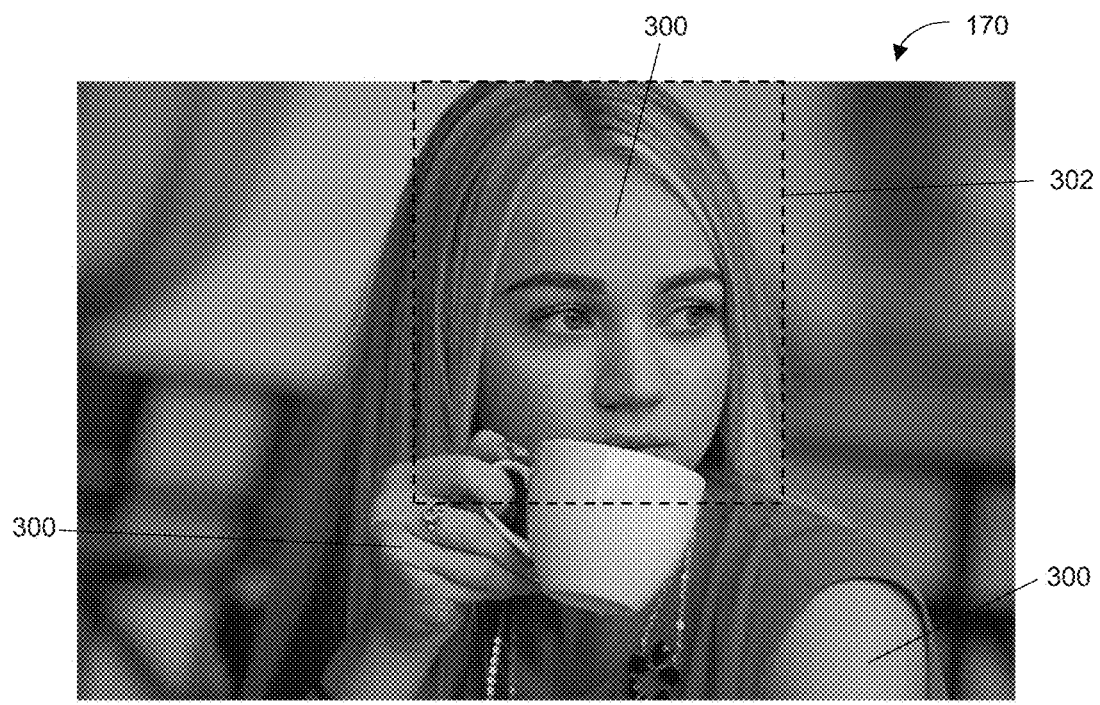
FIG. 5 is an exemplary input original image in accordance with the present disclosure.

As noted above, the first step or process associated with the system 100 can be the skin defects removal step (e.g., removing acne, skin dots and other skin imperfections from the image 170). With reference to FIG. 5, an exemplary input original image 170 is provided. The image 170 can be received as input by the system 100 and electronically stored in the database 104. Each input original image 170 includes one or more skin features 300 capable of being enhanced by the system 100. For example, the skin features 300 can include the face of the person, the arms of the person, the hands of the person, the legs of the person, the body of the person, or the like. In some embodiments, the system 100 can generate a low resolution image 172 of the input original image 170 for further processing to optimize or improve the operational speed of the system 100 in enhancing one or more skin features 300 in the input original image 170. The low resolution image 172 can be electronically stored in the database 104. Although operation of the system 100 is discussed with respect to the input original image 170, in some embodiments, the system 100 can perform the steps discussed herein with the low resolution image 172.

Prior to enhancing the skin features 300 in the image 170, the system 100 can analyze the image 170 to determine which skin features 300 will be the focus of enhancement by the system 100. The skin identification module 130 can receive as input the image 170, and is executed by the processing device 108 to analyze the image 170 and identify one or more skin features 300 to generate an area of interest for enhancement in the form of a skin/face bounding box 302. The bounding box 302 can be used to limit operation of the system 100 on a specific area of the image 170 to reduce the time for enhancement of the image 170. In some embodiments, the skin identification module 130 can be trained to identify and select the face of the individual in the image 170 as the skin features 300 to be enhanced. In some embodiments, the skin identification module 130 can be trained to identify any skin features 300 in the image 170 to be enhanced.

In some embodiments, if the skin identification module 130 identifies any skin features 300 in the image 170, the system 100 can separate each of the skin features 300 into separate or independent bounding boxes 302 for independent enhancement. In such embodiments, the enhanced skin features 300 can be combined into a single enhanced image 198 by the system 100. In some embodiments, if the skin identification module 130 identifies any skin features 300 in the image 170, the system 100 can separate each of the skin features 300 into separate or independent bounding boxes 302 for simultaneous enhancement of all identified skin features 300. In some embodiments, if the skin identification module 130 identifies any skin features 300 in the image 170, the skin identification module 130 can generate a bounding box 302 capable of including all of the identified skin features 300. In some embodiments, if the skin identification module 130 identifies multiple individuals in the image 170, the system 100 can separate each of the individuals into separate or independent bounding boxes 302 and can apply individual neural network masks 176 for retouching or enhancing each of the individuals (e.g., combining the enhanced individuals at a later stage into a final enhanced image 198). If the skin identification module 130 does not identify any skin features 300 in the image 170, the process performed by the system 100 can cease.

The skin identification module 130 can identify any skin features 300 within the image 170 by applying a skin detection algorithm. In some embodiments, the skin identification module 130 can operate in combination with the neural network 118 to recognize and segment specific skin features 300 of the image 174. For example, the skin detection network 120 of the neural network 118 can be trained to detect, define and segment the skin features 300 of the image 174. The mask generation module 132 and the neural network 118 thereby receive as input the image 174 and generate bounding boxes 174 for groups of pixels of the image 174 in which the skin features 300 are detected.

A rectangle or any other shape can be used to create the bounding box 302 calculated to encompass the skin features 300 as the area of interest. The bounding box 302 can be used to crop or cut away the remainder of the image 170, allowing the system 100 to focus enhancement on the cropped bounding box 170. If multiple bounding boxes 302 are used by the system 100, multiple neural network masks 176 can be generated (as discussed below) for the skin features 300 in each of the bounding boxes 302. If a single bounding box 302 is used by the system 100, a single neural network mask 176 can be generated for the skin features 300 in the bounding box 302.

Figure 6:
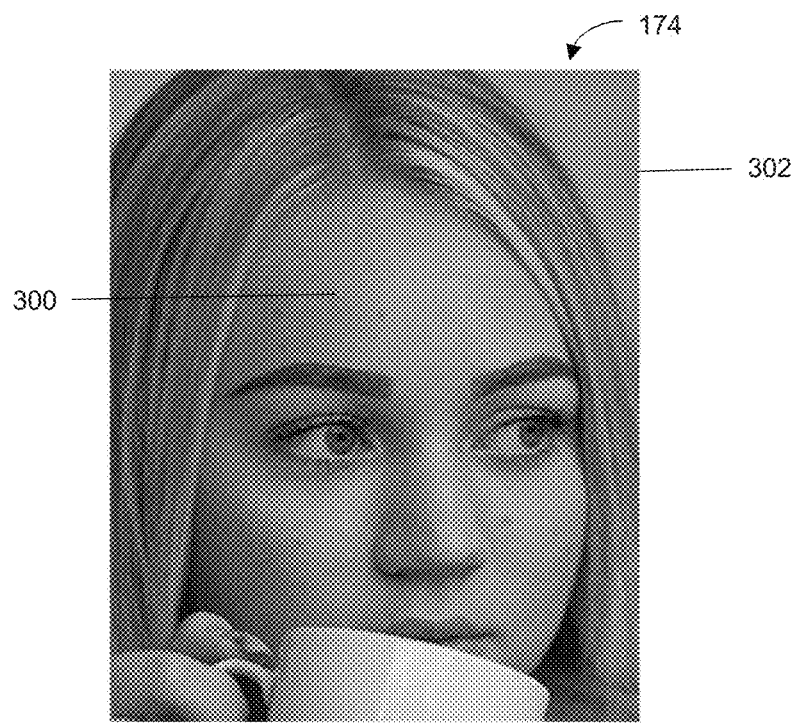
FIG. 6 is an exemplary bounding box image in accordance with the present disclosure.
Figure 7:
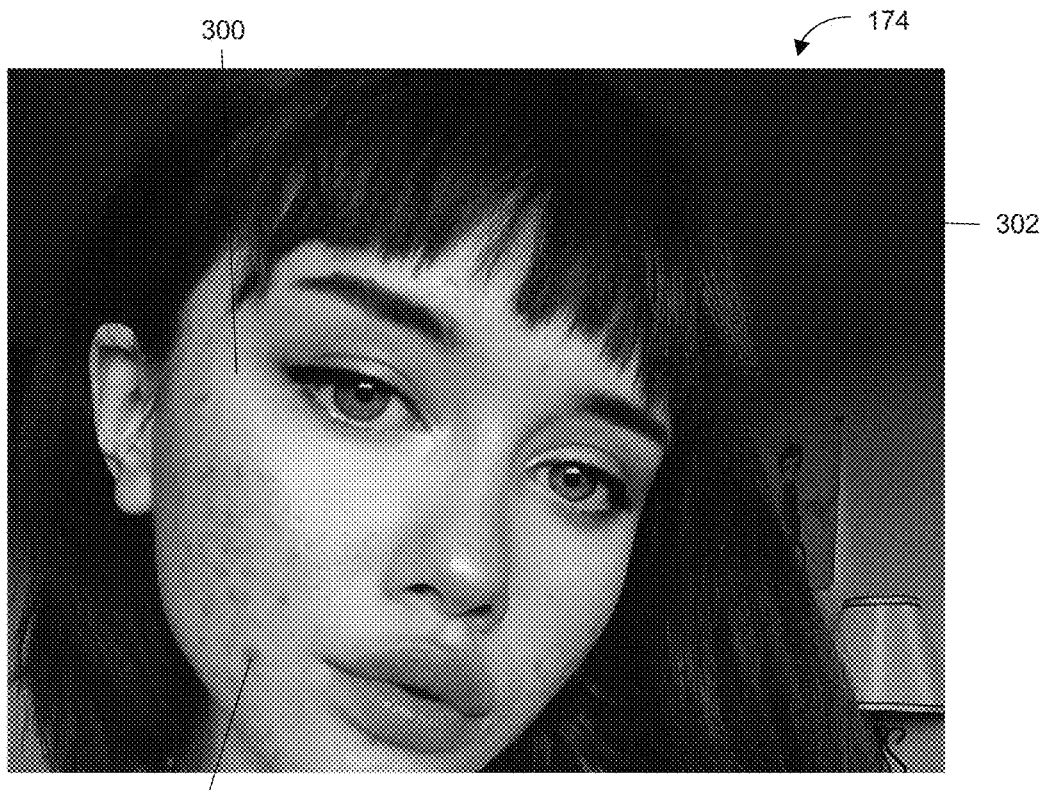
FIG. 7 is an exemplary bounding box image in accordance with the present disclosure.

FIG. 6 is an exemplary bounding box image 174 cropped with the bounding box 302 of FIG. 5. The skin features 300 selected within the bounding box 302 of FIG. 6 include the face of the individual. FIG. 7 is another exemplary bounding box image 174 cropped with the bounding box 302 of an original image 170 (not shown). The skin features 300 selected within the bounding box 302 of FIG. 7 include the face of the individual.

Figure 8:
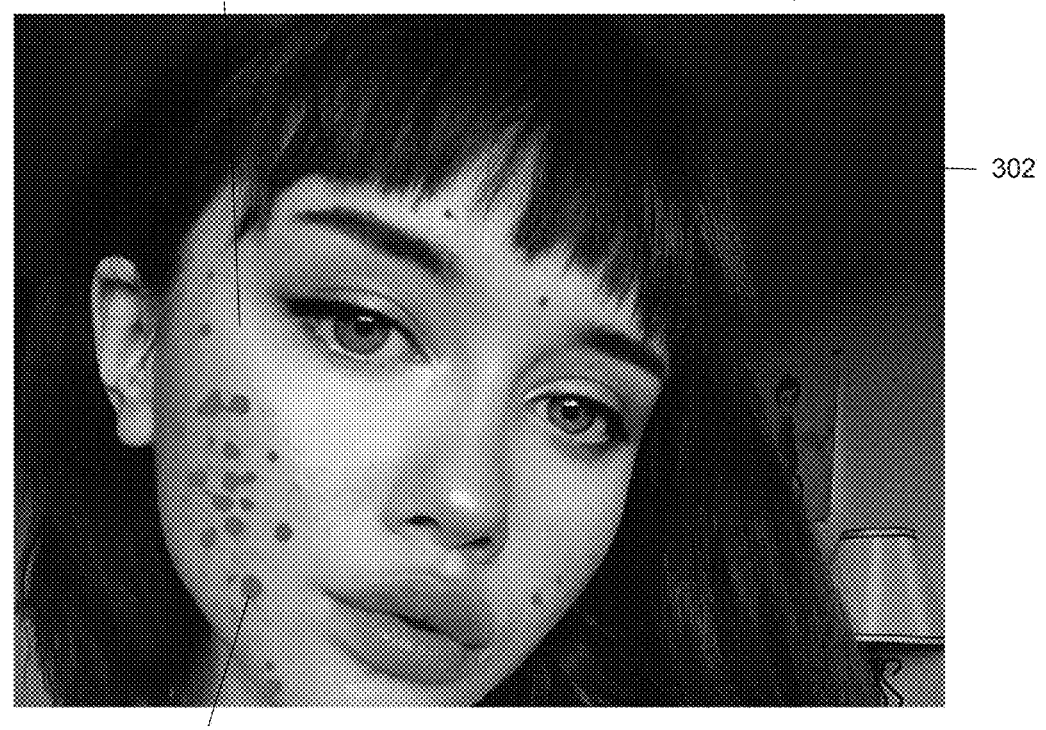
FIG. 8 is an exemplary image including a neural network mask in accordance with the present disclosure.

With reference to FIG. 8, the mask generation module 132 can receive as input the bounding box image 174 (or alternatively the original image 170), and is executed by the processing device 108 to generate a neural network mask 176 to be electronically stored in the database 104. The mask generation module 132 can operate in combination with the neural network 118 to recognize and segment specific skin defects or imperfections (e.g., spots 304) of the image 174. For example, the defect detection network 122 of the neural network 118 can be trained to detect, define and segment the skin defects or imperfections of the image 174. The mask generation module 132 and the neural network 118 thereby receive as input the image 174 and generate a probability skin defect mask (e.g., neural network mask 176) for each pixel of the image 174 in which the skin defects are detected. As an example, a probability value can be used for determining the probability of the pixel being associated with the skin defect or imperfection to be enhanced or removed. The probability value is in a range of 0% to 100%, with 0% representing no skin defect or imperfection and 100% representing a skin defect or imperfection. If the probability value is greater than 90%, for example, the system 100 can interpret such probability value as a true statement of a skin defect or imperfection detection. However, the probability value used for such determination can vary depending on the neural network 118 architecture and/or on how the neural network 118 is trained. For example, in some embodiments, a probability value of 80% or higher, or a probability value of 95% or higher could be used as a true statement of a skin defect or imperfection detection. The neural network 118 thereby allows for a precise determination of skin defects or imperfections in the image 174 without necessitating manual selection by the user.

For clarity, FIG. 8 illustrates the neural network mask 176 in red. The skin defects or imperfections identified by the neural network mask 176 can depend on the neural network 118 architecture and/or training. For example, FIG. 8 only marks some of the skin defects or imperfections. However, the neural network 118 can be training with a library of photographs of skin defects or imperfections for training. The neural network 118 can use such dataset to improve identification of all skin defects or imperfections for future neural network mask 176 generation. In some embodiments, the neural network mask 176 can include individual patches or islands 178 that mask areas of skin imperfections that the system 100 is to enhance or remove. In some embodiments, the islands 178 can be grouped together by the system 100 based on the general relationship of the islands 178 relative to each other.

Figure 9:
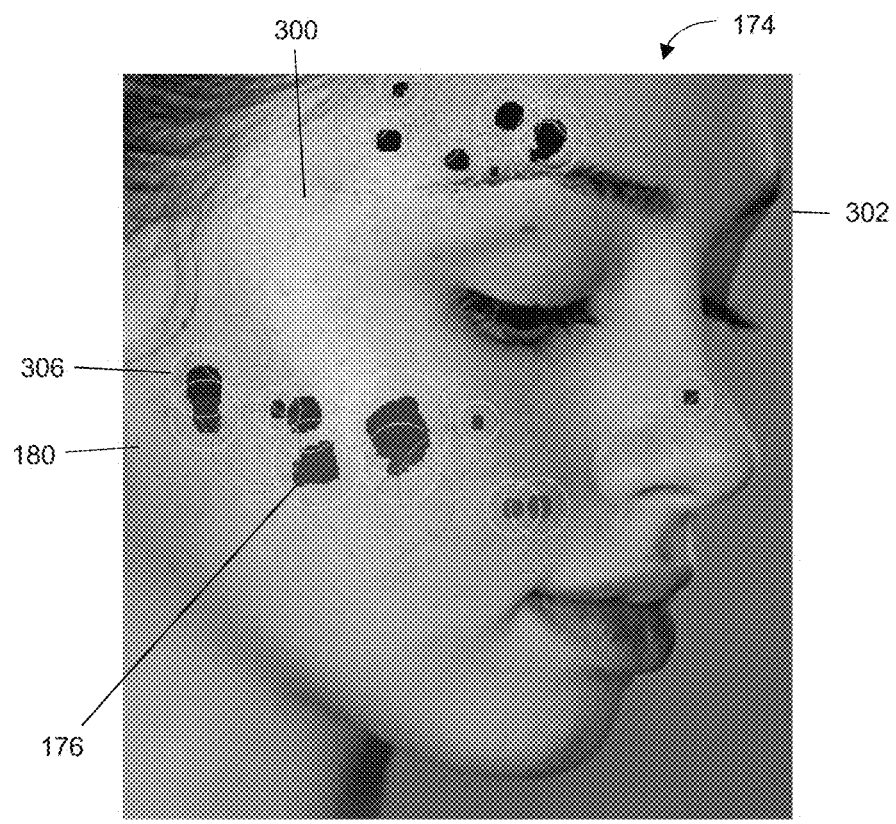
FIG. 9 is an exemplary image including a neural network mask, defect areas and source patches in accordance with the present disclosure.

With reference to FIG. 9, the skin generation module 134 can receive as input the image 174 and the neural network mask 176, and is executed by the processing device 108 to generate a replacement skin texture in the form of one or more skin source patches 180. The skin source patches 180 can be used to replace imperfection areas on the skin marked with the mask 176. Traditional retouching systems may use blurring to correct such skin imperfections. However, simply blurring such skin imperfections with the mask 176 can result in blurry spots noticeable as unrealistic retouching. New skin textures are therefore generated by the skin generation module 134 to provide for a more realistic retouching of the image 174.

Although various content aware filling algorithms can be used to generate new skin to fill the areas marked with the mask 176, the system 100 generates new skin source patches 180 to replace the imperfection areas marked with the mask 176 for an efficient, real-time (or substantially real-time) and non-destructive process of improving the image 174. The skin generation module 134 can fill the imperfection areas by breaking the mask 176 into patches. For example, the mask generation module 132 can calculate the color model for each of the defects associated with the islands 178 to determine islands 178 having similar color models (e.g., parts of the image 174 having the same or substantially similar color and minimal border difference). The islands 178 with similar color and minimal border differences can be blended with the image 174.

In particular, the dark areas in FIG. 9 represent the mask 176 designating the skin defects, the yellow circles around the defects define a defect area 306 for each respective mask 176, and the green circles define source patches 180. The defect area 306 can be set such that the entire mask 176 is entirely encompassed by the defect area 306. For each patch or defect area 306, the skin generation module 134 can look for a source patch 180 for painting on the skin area to be enhanced (e.g., the mask 176). The skin generation module 134 can select pixels on the contours or edges of the defects, consider the pixels as skin samples, and builds a probabilistic model based on the Gaussian mixture model to identify the pixels as corresponding to skin. The source patch 180 selected for a respective mask 176 can be dependent on the radius of the defect area 306, the radius of the source patch 180, and the distance between the defect area 306 and the source patch 180.

In some embodiments, the source patch 180 having the shortest distance from the defect area 306 can be selected as the source patch 180 for enhancing or correcting the defect area 306. In some embodiments, the source patch 180 selected for enhancing or correcting the defect area 306 must at least partially overlap with the defect area 306 to be enhanced or corrected. In some embodiments, the diameter of the source patch 180 used to enhance or correct the defect area 306 shares the same or substantially similar diameter with the defect area 306. After the skin generation module 134 determines the appropriate source patch 180 for a defect area 306, the skin replacement module 136 can be executed by the processing device 108 to paste or place the source patch 180 over the defect area 306 to replace the defect area 306, thereby correcting skin defects in the defect area 306. Such replacement of the defect area 306 is performed with a source patch 180 of real skin of the individual in the image 174 and skin having substantially similar color and/or shading due to the proximity of the source patch 180 with the defect area 306.

Figure 10:
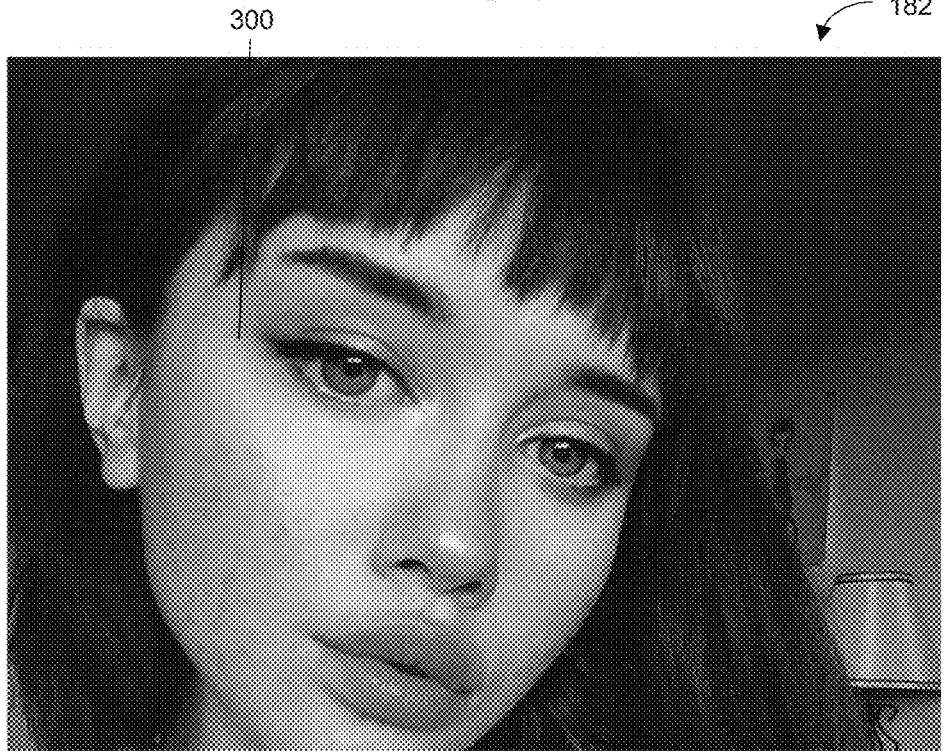
FIG. 10 is an exemplary patch skin image in accordance with the present disclosure.

In some embodiments, the source patch 180 can be applied to the defect area 306 using a mean value coordinates technique. In some embodiments, the source patch 180 can be applied or inserted to the defect area 306 using interpolation. Because interpolation can be used, the image 174 can be distorted by previous effects and undistorted pieces can be automatically correctly adjusted in brightness. The defect area 306 can thereby be replaced by a source patch 180 of normal skin having substantially similar visual characteristics. The system 100 can repeat the steps for correcting defect areas 306 to ensure each of the masks 176 is corrected prior to proceeding to the next enhancement steps. FIG. 10 is a patch skin image 182 generated by the skin replacement module 136. In particular, FIG. 7 is the image 174 with the defect spots 304, FIG. 8 is the image 174 with the mask 176 designating areas to be replaced with source patches 180, and FIG. 10 is the patch skin image 182 with the defect spots 304 replaced with respective source patches 180 in a realistic manner. As can be seen when comparing FIGS. 7 and 10, some of the darker and/or larger skin imperfections have been removed.

Figure 11:
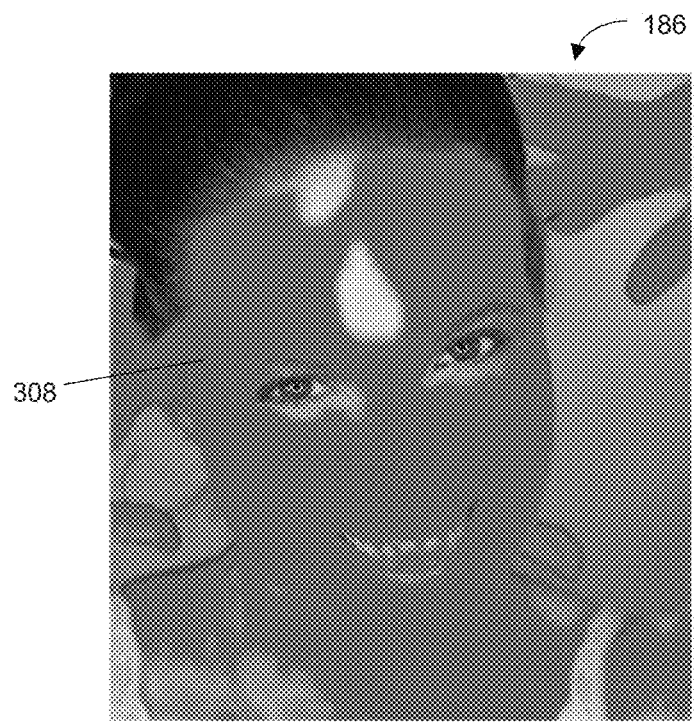
FIG. 11 is an exemplary masked skin image in accordance with the present disclosure.
Figure 12:
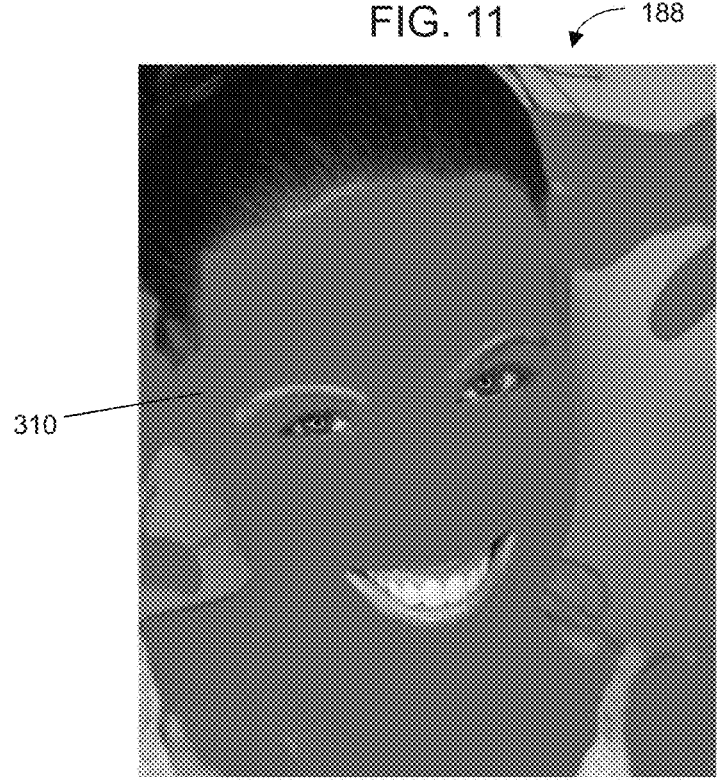
FIG. 12 is an exemplary masked skin tone image in accordance with the present disclosure.

After certain defect areas 306 have been corrected with the source patches 180, the system 100 can smooth the skin and remove stains and/or bumps on the skin. The system 100 can achieve such smoothing of the skin by eliminating all bumps in a realistic manner (e.g., not merely blurring of the skin). The system 100 preserves all pores of the skin and maintains clarity in all details on the face that are not skin (e.g., eyebrows, hair, nose, lips, or the like) during the smoothing process. With reference to FIGS. 11 and 12, the first step of the smoothing process involves execution of the mask generation module 132 with the processing device 108 to receive as input the patched skin image 182, and to generate the masked skin image 186.

As discussed above, the neural network 118 can be trained to generate the neural network mask 176 encompassing the skin of the individual in the image 170. Additional masks can be generated by the mask generation module 132 in combination with the neural network 118 for the skin smoothing process. Although the mask 176 is helpful in identifying skin imperfections, for the skin smoothing process, a mask of the entire skin of the individual visible in the image 170 (or the skin of the face) can be used. The mask generation module 132 can be executed by the processing device 108 to receive as input the image 170 (or the image 174), and in combination with the neural network 118, generates a masked skin image 186 having a mask 308 of the human figure in the image 170. The neural network 118 can be trained to detect and segment the human figure in the image 170 and, particularly, the human skin in the image 170. FIG. 11 shows an exemplary masked skin image 186. The mask 308 is a refined skin mask limited to the human contour. False positives can be cut off when the pixels are detected to include colors or textures not similar to human skin. However, a further refined mask may be needed for the skin smoothing process to ensure details of the face remain intact after enhancement.

With reference to FIG. 12, the mask generation module 132 can be executed by the processing device 108 to receive as input the image 186 and the mask 308, and in combination with the neural network 118, generates a masked skin tone image 188 having a refined mask 310 focused on the face of the human in the image 170. The neural network 118 can be trained at a high accuracy to detect and segment the face of a human in the image 170 including facial features, generating the mask 310 that excludes the facial features. The mask 310 thereby focuses on the skin of the human without encompassing facial features, such as eyebrows, hair, nose, and lips, to ensure the subsequent enhancing steps are performed on only the skin. The mask generation module 132 can determine the person's face in the image 186 and the neural network 118 can segment the face. The neural network 118 determines the skin zone on the face of the person and face segmentation is used to accurately obtain the mask 310 for the skin area on the person's face.

The neural network 118 can analyze the tone and/or texture of each pixel in the image 186 to determine which pixels include tone and/or texture similar to human skin and which pixels do not. The pixels having tone and/or texture different from human skin can be identified and details of the face and excluded from the mask 310. The mask 310 provides an accurate representation of human skin on the face in the image 170. In some embodiments, the mask generation module 132 can be executed in combination with the skin tone module 142 to determine the tone and/or texture of each pixel. Although discussed herein as a mask 310 for the face, in some embodiments, the mask 310 can be for all skin of the individual visible in the image 170 (excluding facial and/or human details). Due to the automated process of the mask generation module 132 and the neural network 118, an accurate mask 310 can be generated without manual input and/or selection in the system 100.

Figure 13:
FIG. 13 is an exemplary masked skin image in accordance with the present disclosure.
Figure 14:
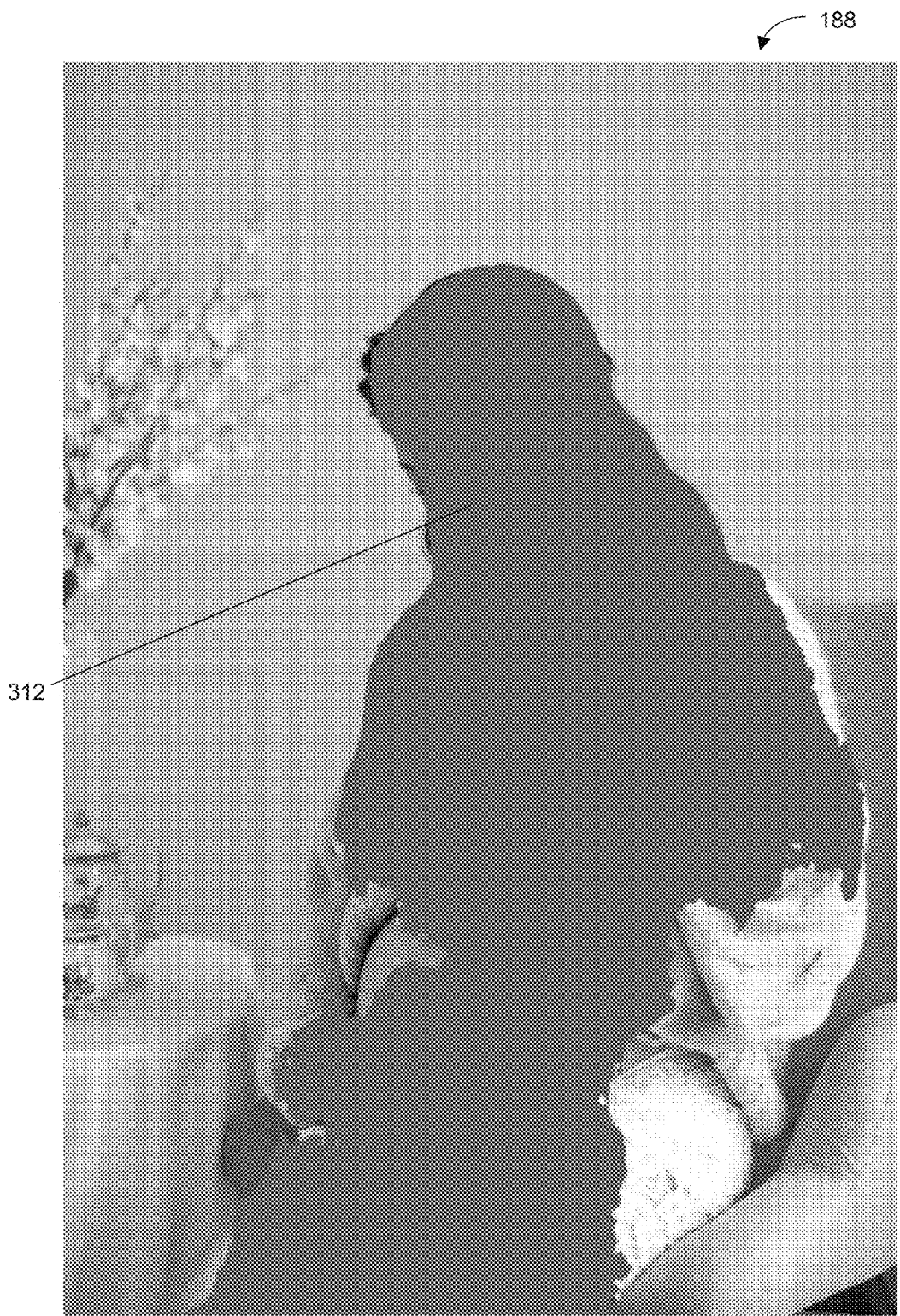
FIG. 14 is an exemplary image including a human mask in accordance with the present disclosure.
Figure 15:
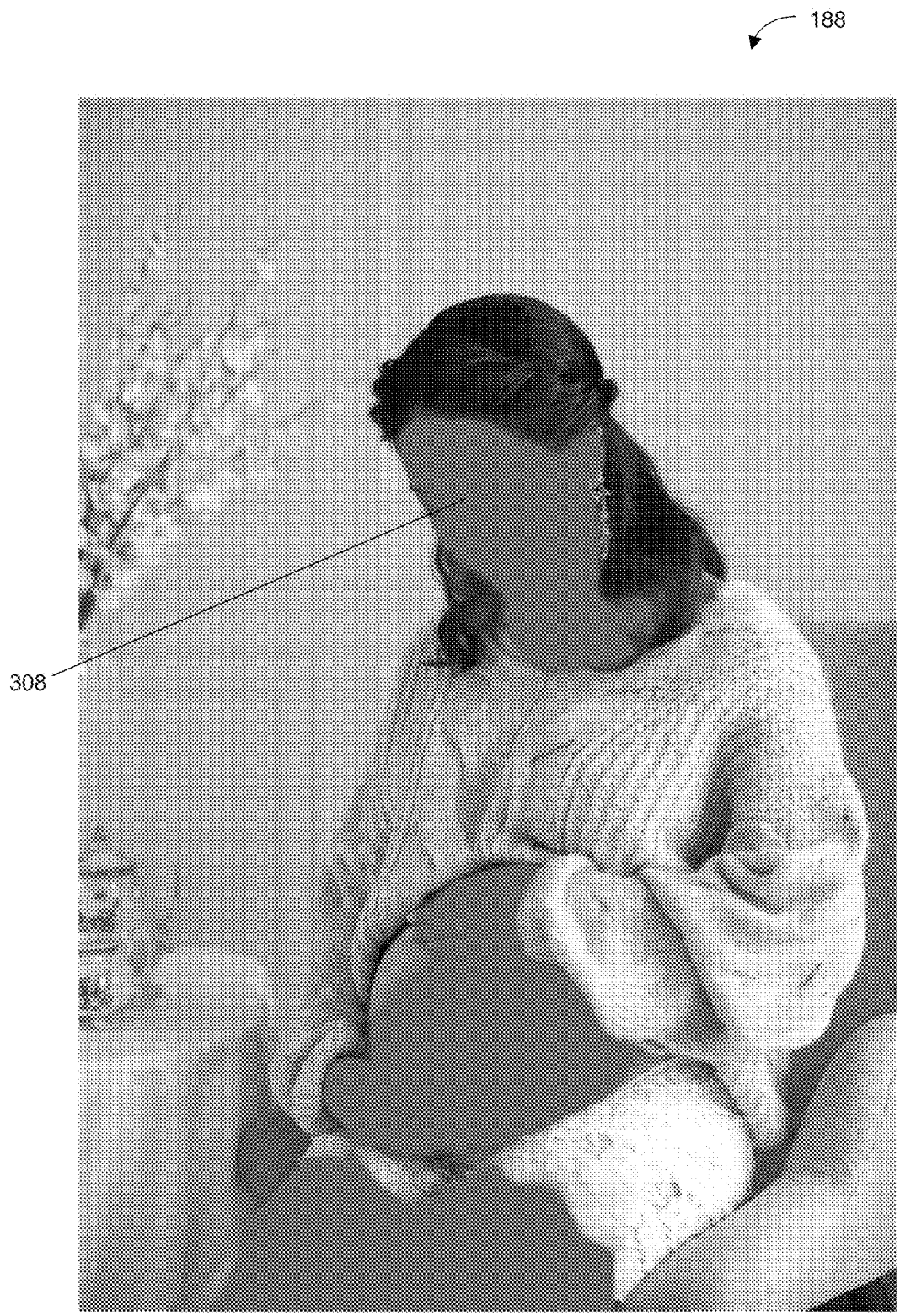
FIG. 15 is an exemplary masked skin tone image in accordance with the present disclosure.

FIG. 13 is another example of a masked skin image 186 including the skin mask 308. The mask 308 is shown in red for clarity. Due to the similarity in tone of the armchair at the bottom right of the image 186, the mask 308 inadvertently also includes portions of the armchair. FIG. 14 is the image 186 with a human mask 312 segmented from the neural network 118 model. The mask 312 can be used to identify the human in the image 186. In particular, the human mask 312 can be used to ensure that only those features of the image 186 corresponding with a recognized shape of a human body are used for further enhancement. For example, the portions of the armchair inadvertently included in the mask 308 can be removed due to the difference in shape and/or proximity of the armchair from the human. FIG. 15 is a masked skin tone image 188 including the refined mask 310. The mask 310 includes the skin mask 308 cropped relative to the human mask 312, thereby providing an accurate representation of the skin of the human with details excluded from the mask 310. For example, the mask 308 associated with the armchair has been removed based on the human shape detected in the human mask 312. The mask 310 can be generated by analyzing skin tones to detect facial details, and separating such features from the mask 310. In some embodiments, a support vector machine (SVM) based model can be used to detect and separate facial details from the mask 310.

Figure 16:
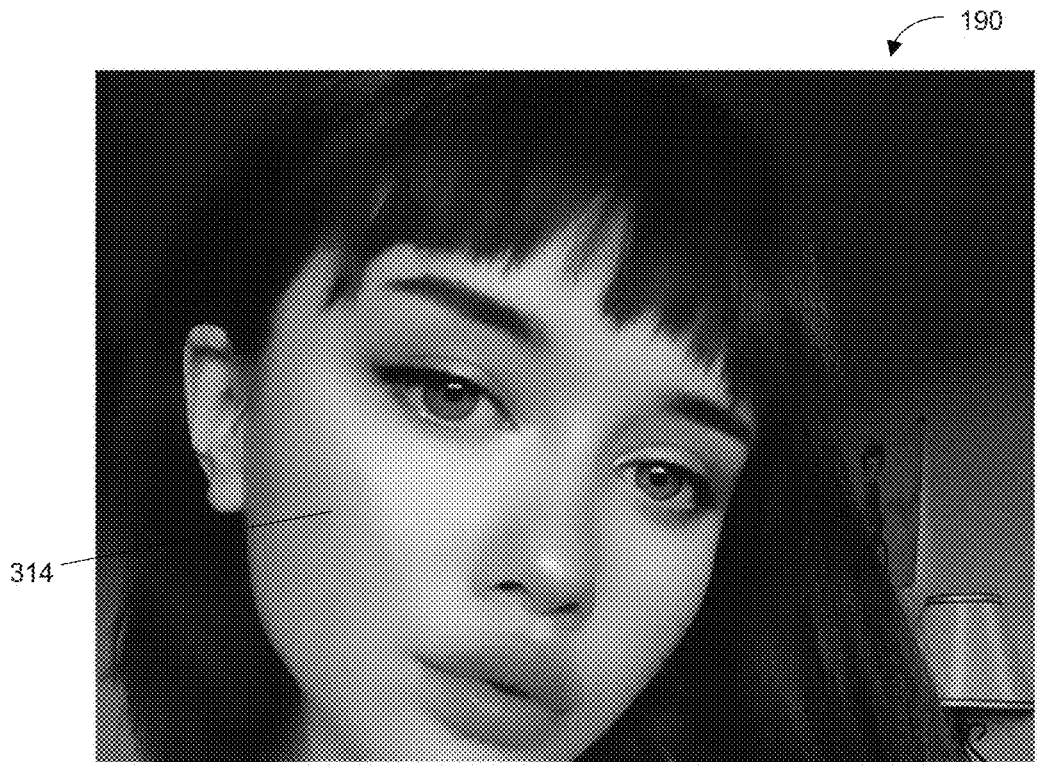
FIG. 16 is an exemplary blurred image in accordance with the present disclosure.
Figure 17:
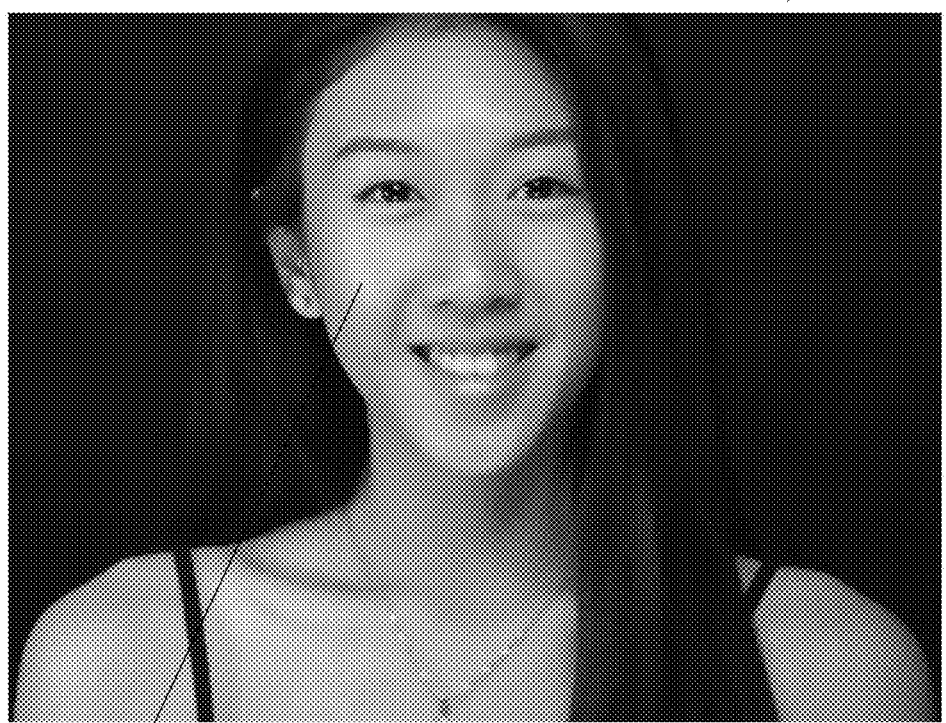
FIG. 17 is an exemplary blurred image in accordance with the present disclosure.

With reference to FIG. 16, the skin smoothing module 138 can receive as input the mask 310 with the image 174 (or the patched skin image 182), and is executed by the processing device 108 to generate a blurred image 190 to be electronically stored in the database 104. In some embodiments, the skin smoothing module 138 can be executed in combination with a blurring module 144 to generate the blurred image 190. Using the mask 310, the skin smoothing module 138 can perform a blur effect on only the skin of the individual without affecting the facial details. In some embodiments, blurring of the skin can be performed using a guided filter. In some embodiments, the blurring can be an edge aware blur to ensure edges associated with the skin are not distorted. The blur strength or parameters can be proportional to the size of the face in the image 174. The size of the face in the image 174 can be determined in different ways. For example, the bounding box 302 can be used to estimate the size of the face (see, e.g., bounding box 302 of FIGS. 5-6). In such instances, the area of the bounding box 302 can be determined, and this area can be used as a coefficient to determining the blur radius. In some embodiments, the individual's face bounding box are be a scale parameter for hardcoded parameters of the blur effect. As compared to FIG. 10, the skin now includes a smoother area 314 in FIG. 16 rather than the skin imperfections remaining in FIG. 10 due to the blurring effect. The blurring effect is performed with a special radius to remove or modify big details in the image, while keeping smaller details. Therefore, small details (such as pores) remain in the modified image, providing a more realistic modification of the image. FIG. 17 is another example of a blurred image 190 including a smoother area 314 on the face of the individual.

Figure 18:
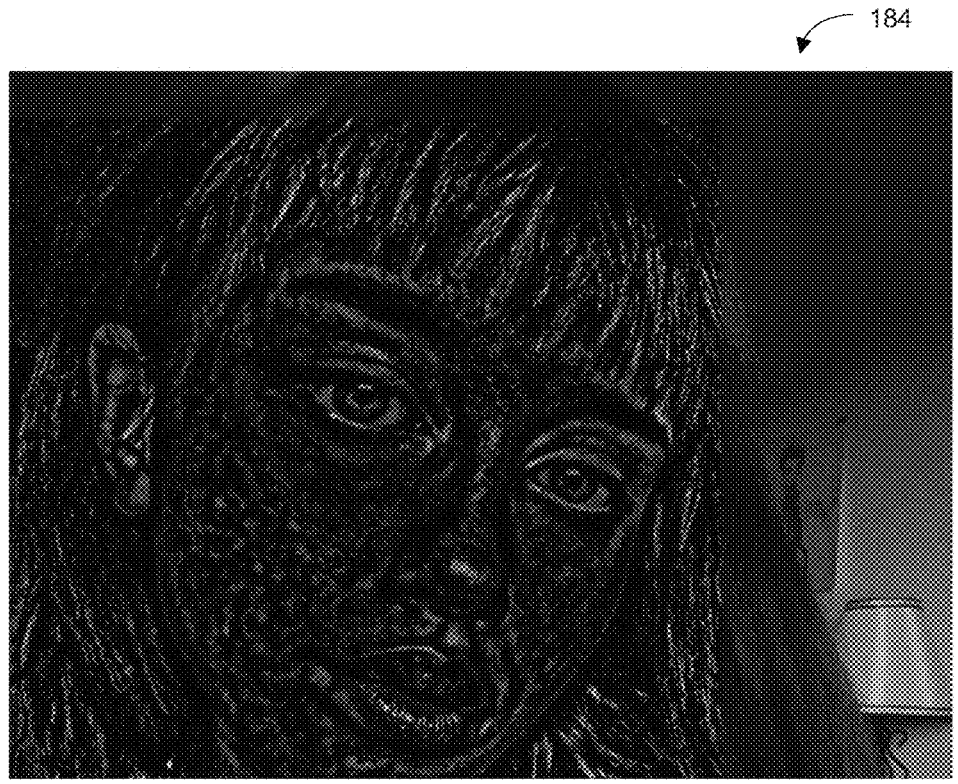
FIG. 18 is an exemplary detail image in accordance with the present disclosure.
Figure 19:
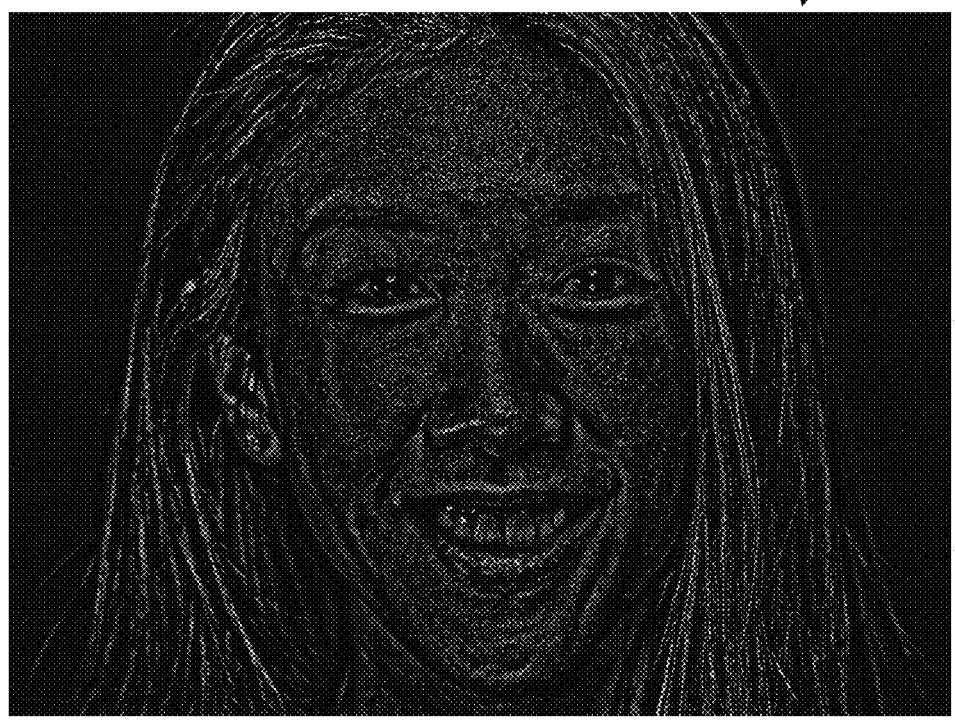
FIG. 19 is an exemplary detail image in accordance with the present disclosure.

With reference to FIG. 18, the detail extraction module 146 can receive as input the image 170 (or image 174), the blurred image 190 and the mask 310, and is executed by the processing device 108 to generate one or more detail images 184. The detail image 184 of FIG. 18 is associated with the blurred image 190 of FIG. 16. The detail image 184 can be generated by subtracting the blurred image 190 from the image 170 (or image 174) to obtain details associated with the face of the individual. For clarity purposes, the details in FIG. 18 are provided in a x10 magnification from the actual details in the original image 170 to better visualize the modifications made to the image. FIG. 19 is another example of a detail image 184 associated with the blurred image 190 of FIG. 17.

Figure 20:
FIG. 20 is an exemplary filtered image in accordance with the present disclosure.
Figure 21:
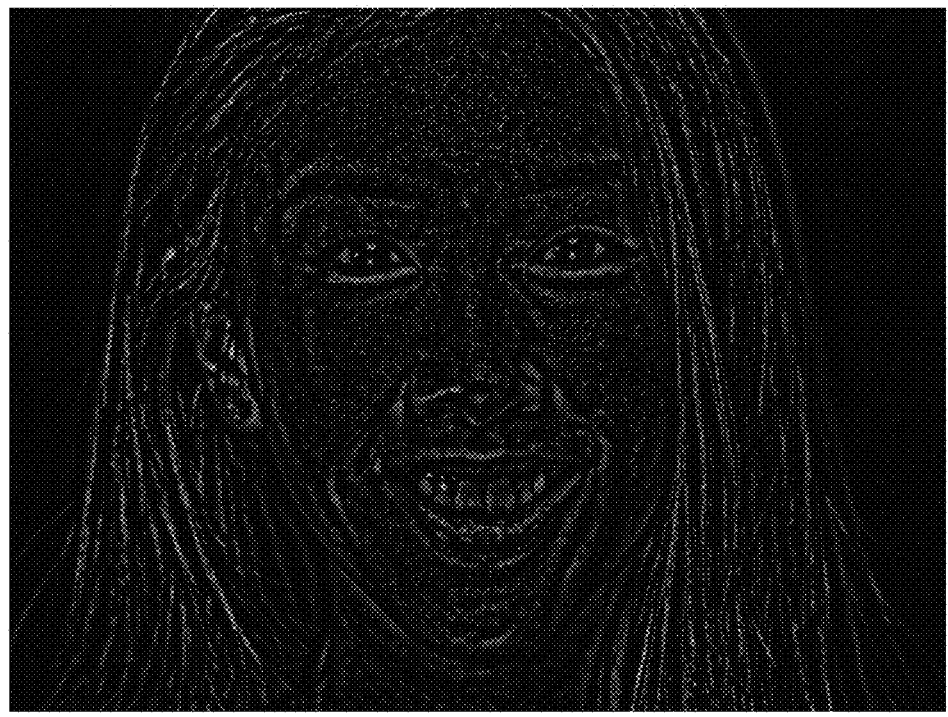
FIG. 21 is an exemplary filtered image in accordance with the present disclosure.
Figure 22:
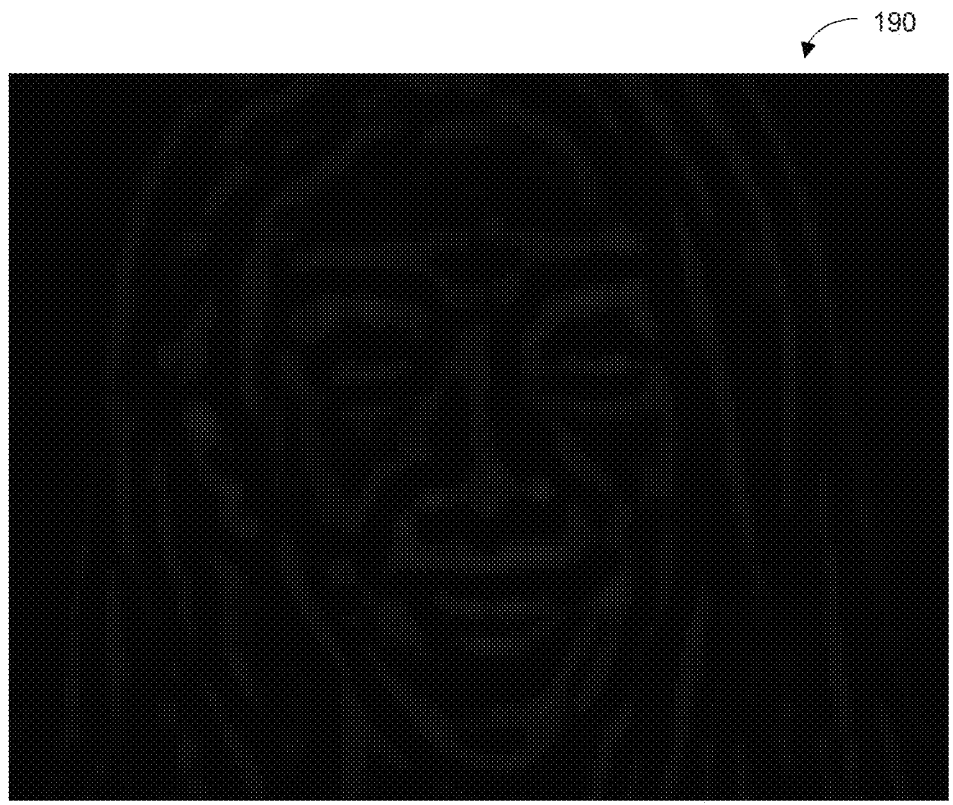
FIG. 22 is an exemplary filtered image in accordance with the present disclosure.

With reference to FIGS. 20-22, the filtering module 140 can receive as input the detail image 184, and is executed by the processing device 108 to generate two or more filtered images 192. The filtering module 140 can filter parts of the detail image 184 into various sizes, e.g., splitting details of the detail image 184 into three frequency gaps. The filtering module 140 can blur the detail image 184 with different kernels each having different radius of the blur. The radius is a value measured in pixels. In some embodiments, the different sizes can be small kernels, medium kernels, and big kernels, each representing the blur radius that determine the size of the parts into which the detail image 184 will be decomposed by the filtering module 140. The radius can be proportional to the size of the person in the image. The radius of blur can be dependent on the size of the person in the image. In some embodiments, the radius of blur can be input (and varied) by the user, or can be automatically set (or varied) by the system 100.

The size of the person in the image can be determined in various ways. For example, the small kernels or fine details can be determined based on the algorithm represented by Equation 1:

$$\text{fine\_details} = \text{details} - \text{blur (details, small kernel)} \quad (1)$$

where details is the detail image 184 and blur is the blurring function based on the details and the small size of the kernel. The medium kernels or medium details can be determined based on the algorithm represented by Equation 2:

$$\text{medium\_details} = \text{fine\_details} - \text{blur (details, medium kernel)} \quad (2)$$

where fine_details is the small or fine details and blur is the blurring function based on the details and the medium size of the kernel. The large kernels or large details can be determined based on the algorithm represented by Equation 3:

$$\text{large\_details} = \text{medium\_details} - \text{blur (details, big kernel)} \quad (3)$$

wherein medium_details is the medium details and blur is the blurring function based on the details and the large size of the kernel. Different frequency decomposition ranges or gaps can thereby be obtained. As an example, FIG. 20 shows a filtered image 192 including details in the small or fine frequency gap for the detail image 184 of FIG. 19, FIG. 21 shows a filtered image 192 including details in the medium frequency gap for the detail image 184 of FIG. 19, and FIG. 22 shows a filtered image 192 including details in the large frequency gap for the detail image 184 of FIG. 19.

Figure 23:
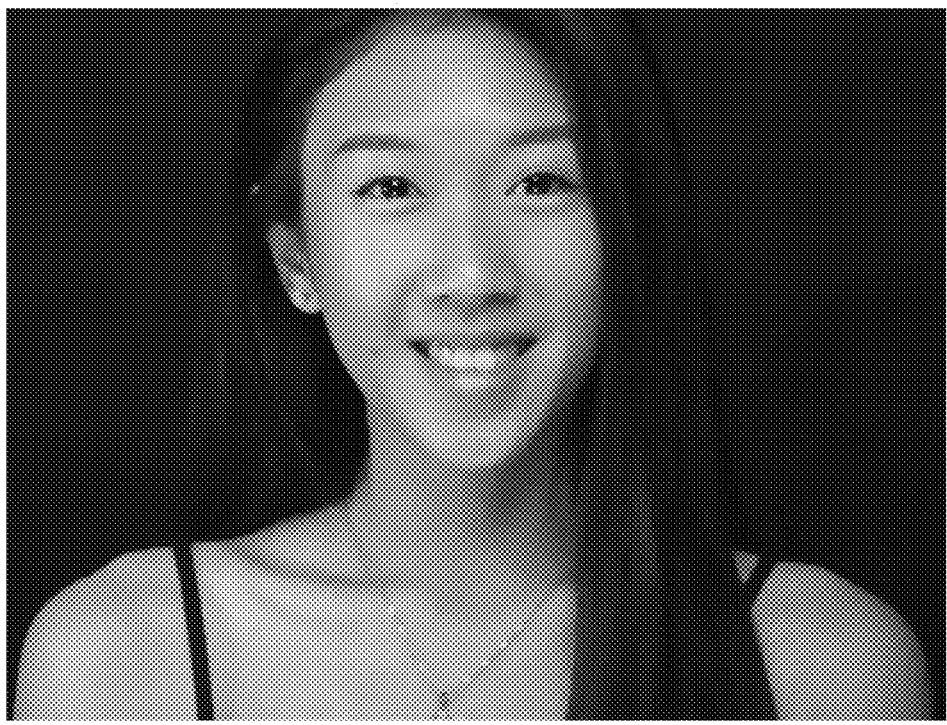
FIG. 23 is an exemplary combined image in accordance with the present disclosure.
Figure 24:
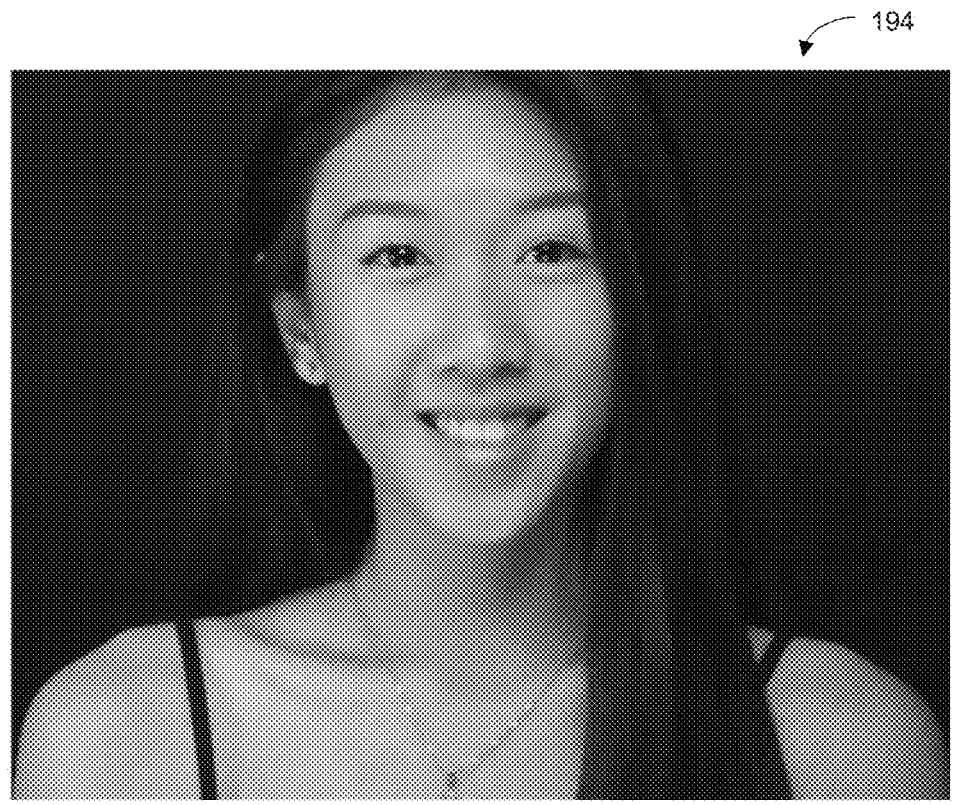
FIG. 24 is an exemplary combined image in accordance with the present disclosure.
Figure 25:
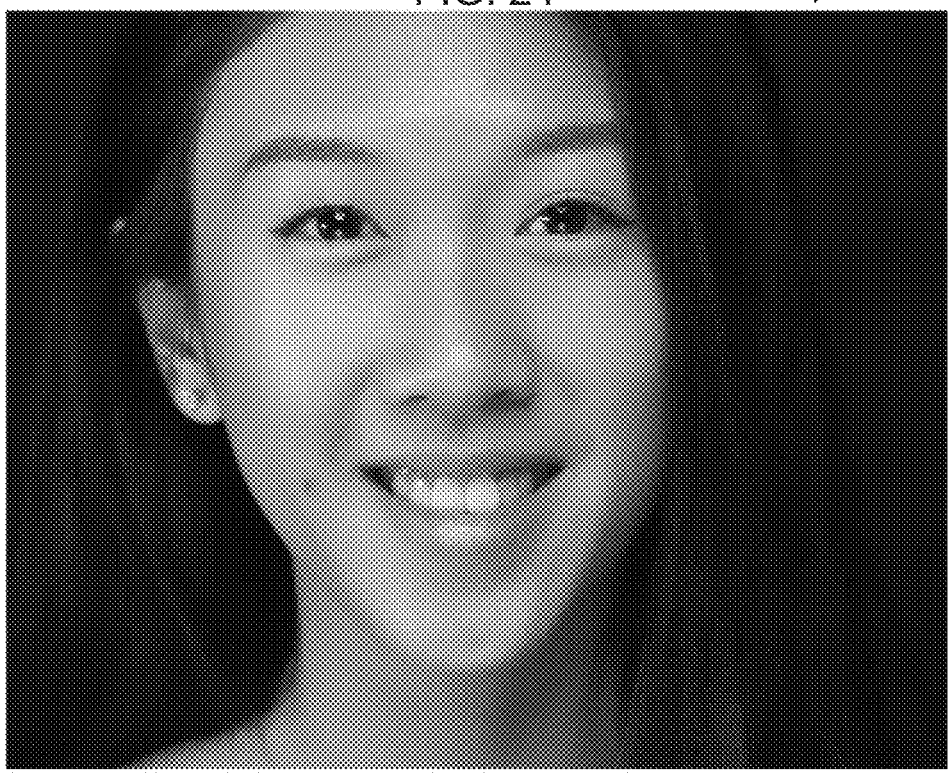
FIG. 25 is an exemplary combined image in accordance with the present disclosure.

With reference to FIGS. 23-25, the mixing module 148 can receive as input the blurred image 190 and the filtered images 192 in each of the frequency gaps, and is executed by the processing device 108 to generate one or more combined images 194. The mixing module 148 can combine the filtered images 192 having different frequency decompositions of the masked portion of the face with the blurred image 190. Generating the combined image 194 can be represented by Equation 4:

$$\begin{aligned}\text{composed\_image} = &\text{blurred\_image} + \\ &\text{amount\_small} * \text{fine\_details} + \\ &\text{amount\_medium} * \text{medium\_details} + \\ &\text{amount\_large} * \text{large\_details}\end{aligned} \quad (4)$$

where amount small represents the power of manifestation of the small details (e.g., small radius) in the filtered images 192, amount_medium represents the power of manifestation of the medium details (e.g., medium radius) in the filtered images 192, and amount_large represents the power of manifestation of the large details (e.g., large radius) in the filtered images 192.

FIG. 23 is a combined image 194 including a combination of the blurred image 190 and the filtered image 192 having large details. FIG. 24 is a combined image 194 including a combination of the blurred image 190 and the filtered images 192 having large and medium details. FIG. 25 is a combined image 194 including a combination of the blurred image 190 and the filtered images 192 having large, medium and small details. Because the system 100 allows control over the power of manifestation of details of different sizes, details of a certain size can be removed if desired. For example, during combination of the blurred image 190 with the filtered images 192, the mixing module 148 can remove details of different sizes depending on the strengths of manifestation of such details.

Figure 26:
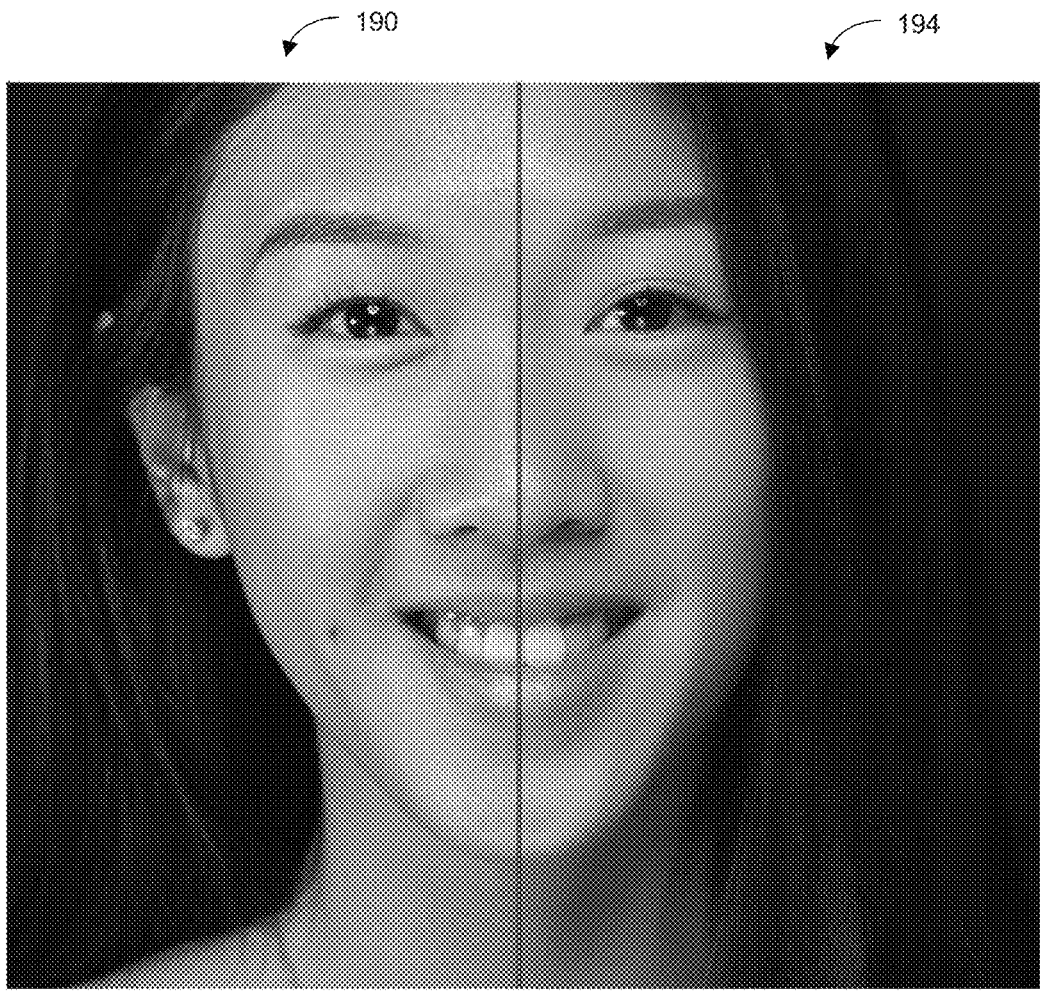
FIG. 26 is an exemplary image showing a blurred image and a combined image in accordance with the present disclosure.

Such determination allows for certain details of the individual to be maintained, while enhancing other areas of the skin of the individual. As an example, spots and other skin imperfections are typically in the medium and/or large frequency gap or size, while pores are typically in the small frequency gap or size. The mixing module 148 can therefore keep the small details to ensure that realistic details such as pores and hair remain in the combined image 194, while significantly removing medium and/or large details to remove undesired skin imperfections. In some embodiments, the ability to remove details of specific sizes can be, e.g., automatically determined by the system 100, preset by the user, manually determined by the user, combinations thereof, or the like. For example, such determination can be varied by the user and/or system 100, set by the user, hardcoded, automatically detected, or the like. The side of the details can be in a varied pixel range, depending on the image resolution and/or the size of the person. FIG. 26 shows the blurred image 190 on the left side and the combined image 194 on the right side after processing with the mixing module 148. As can be seen in FIG. 26, the combined image 194 maintains the details of the individual's face for a realistic image, while enhancing the skin by removing skin imperfections in the large and/or medium size range.

Figure 27:
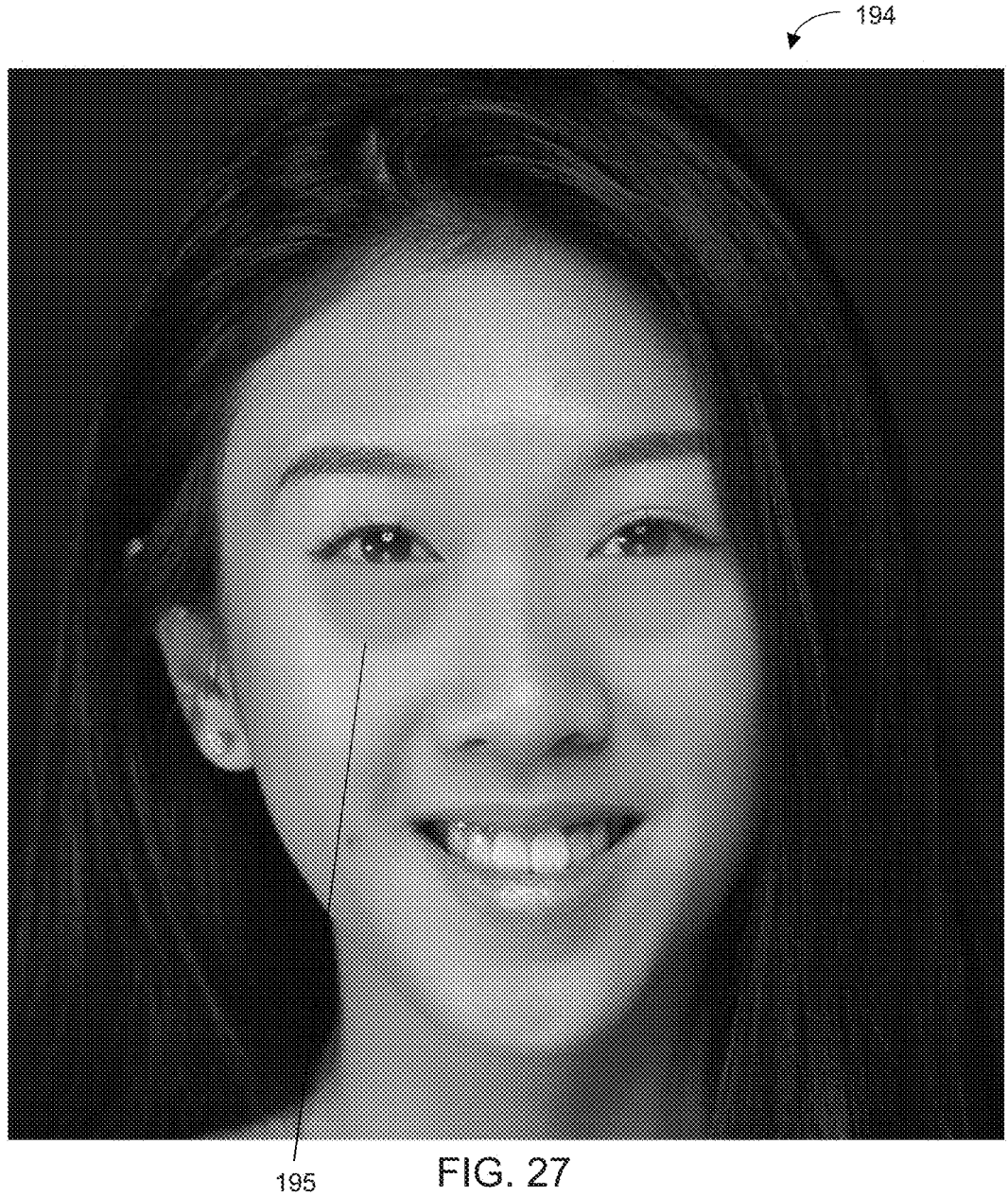
FIG. 27 is an exemplary image including a dark circle mask in accordance with the present disclosure.

With reference to FIG. 27, the mask generation module 132 can receive as input the combined image 194, and is executed by the processing device 108 to generate a dark circle mask 195 on the combined image 194. The dark circle mask 195 is shown in green in FIG. 27 for clarity. The mask generation module 132 can detect facial features or points based on an SVM model to generate the mask 195 for dark circles under the eyes of the individual. The shadow adjustment module 152 can receive as input the combined image 194 and the dark circle mask 195, and is executed by the processing device 108 to increase and/or adjust shadows in the masked regions with a magnitude, strength or intensity proportional to the mean light intensity of the region (and/or the immediately surrounding regions of the face).

Figure 28:
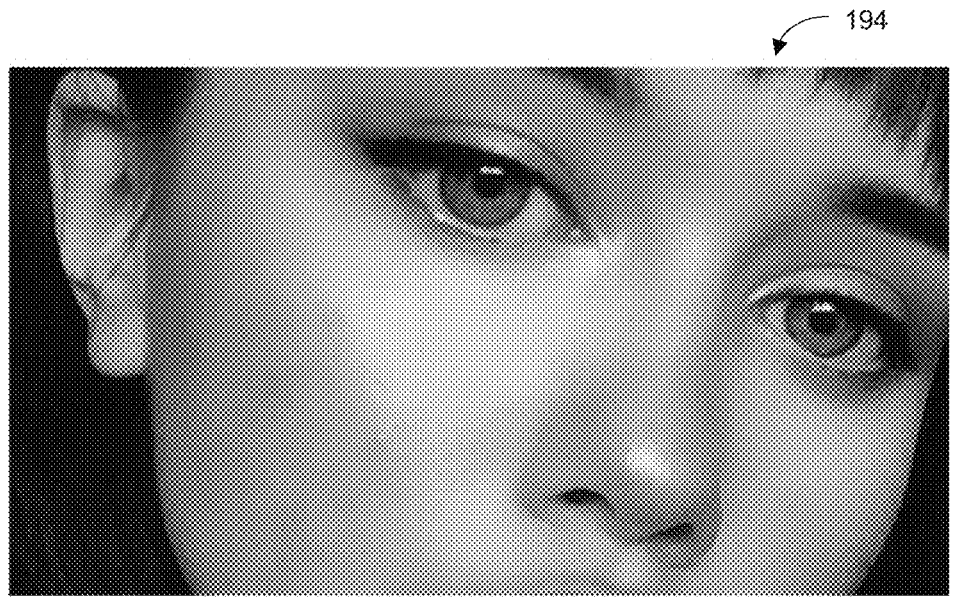
FIG. 28 is an exemplary combined image in accordance with the present disclosure.
Figure 29:
FIG. 29 is an exemplary combined image in accordance with the present disclosure.
Figure 30:
FIG. 30 is an exemplary noise image in accordance with the present disclosure.
Figure 31:
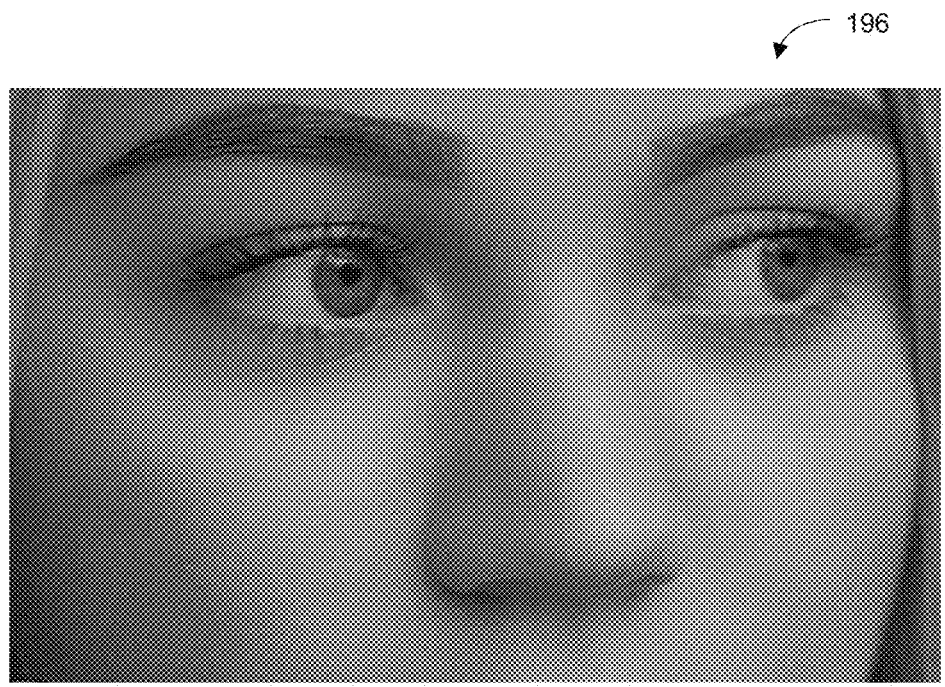
FIG. 31 is an exemplary noise image in accordance with the present disclosure.

With reference to FIGS. 28-29, the noise generation module 150 can receive as input the combined image 194 (and/or the shadow enhanced image) and one or more of the masks discussed herein, and is executed by the processing device 108 to generate a noise image 196. FIGS. 28-29 show combined images 194 with zero noise effect applied. FIGS. 30-31 show noise images 196 with a small amount of the noise effect applied to provide a realistic enhancement of the individuals. The amount of noise effect applied can vary based on user input, be hardcoded into the system 100, can be automatically varied by the system 100, or the like. In some embodiments, the noise effect can be applied in a range of 10% to 50%. As an example, FIGS. 30-31 show a noise effect of 20% applied. The noise generation module 150 can apply a small amount of noise (e.g., a velvet effect) to blend the image with slight random gray noise. Adding noise to the image ensures that the skin texture remains visible after the prior enhancement stages, resulting in a realistic skin without a flat skin appearance.

After operation of the noise generation module 150, the blending module 154 can receive as input the noise image 196, the original image 170 (or image 174) and the neural network mask 176, and is executed by the processing device 108 to generate a final enhanced image 198. For example, FIG. 28 shows the combined image 194 prior to generation of a final enhanced image 198, and the noise image 196 of FIG. 30 can represent the final enhanced image 198 having some noise effect modification to ensure a more realistic skin. The final enhanced image 198 can be the noise image 196 and the enhancements made to the image at each stage by the system 100 blended or combined with the original image 170 based on the neural network mask 176. The blending module 154 can apply the enhancements or retouching performed by the system 100 to the original image 170 using the neural network mask 176 to ensure only the skin of the individual is affected. All details previously excluded from the neural network mask 176 can remain as originally displayed due the exclusion by the neural network mask 176. The final enhanced image 198 therefore provides as output the original image 170 with all enhancements applied.

Figure 32:
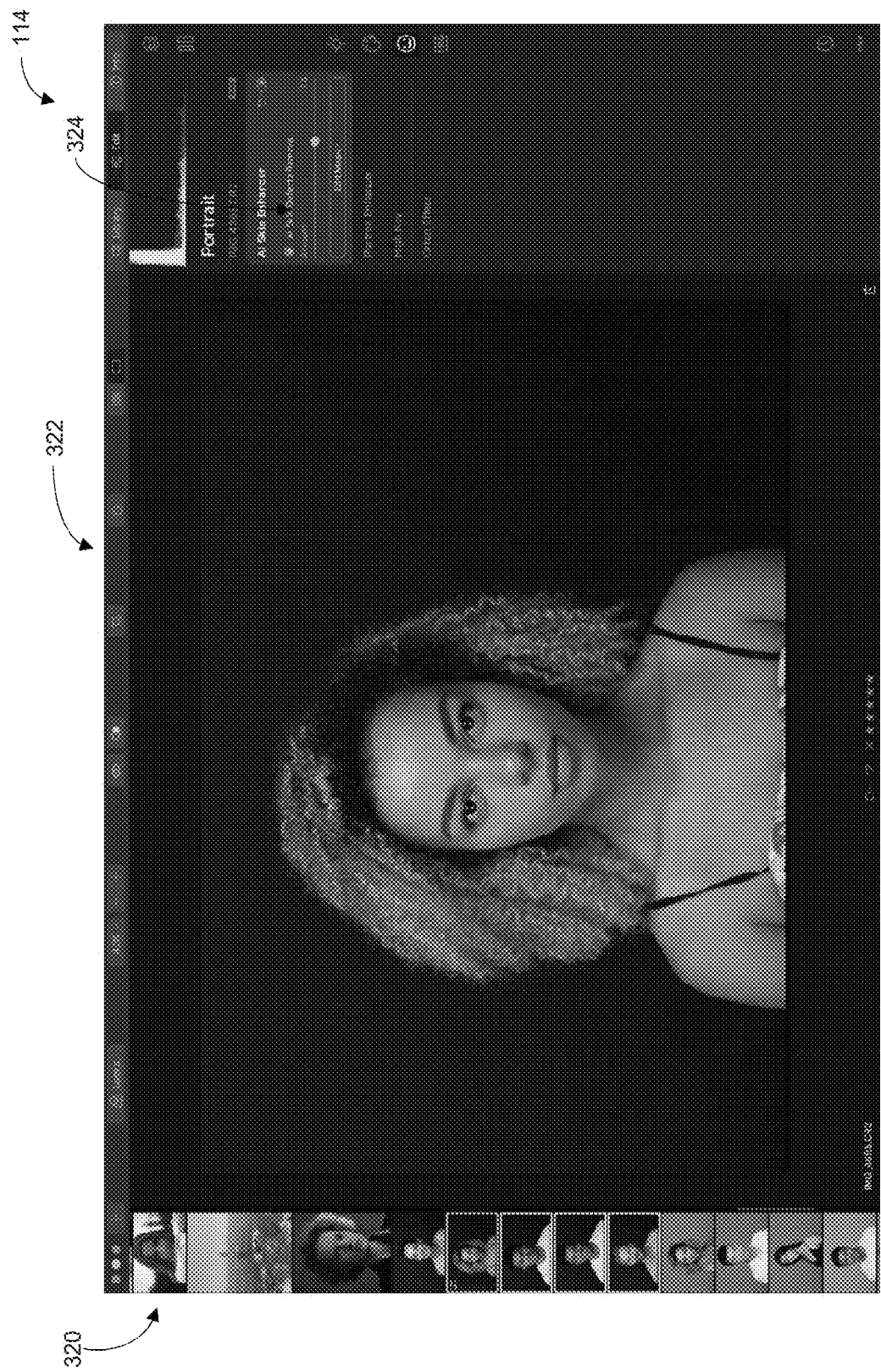
FIG. 32 is a user interface in accordance with the present disclosure.

FIG. 32 is a screenshot illustrating a user interface 114 of the system 100 in accordance with the present disclosure. The user interface 114 includes an image selection section 320 including multiple imported images for potential editing. The user interface 114 includes an image section 322 including a single image to be edited by the system 100. The user interface 114 includes an adjustment section 324 including multiple controls in the form of, e.g., sliders, check boxes, input boxes, preset adjustments, combinations thereof, or the like, for various setting controls associated with enhancement of the image in the image section 322.

Figure 33:
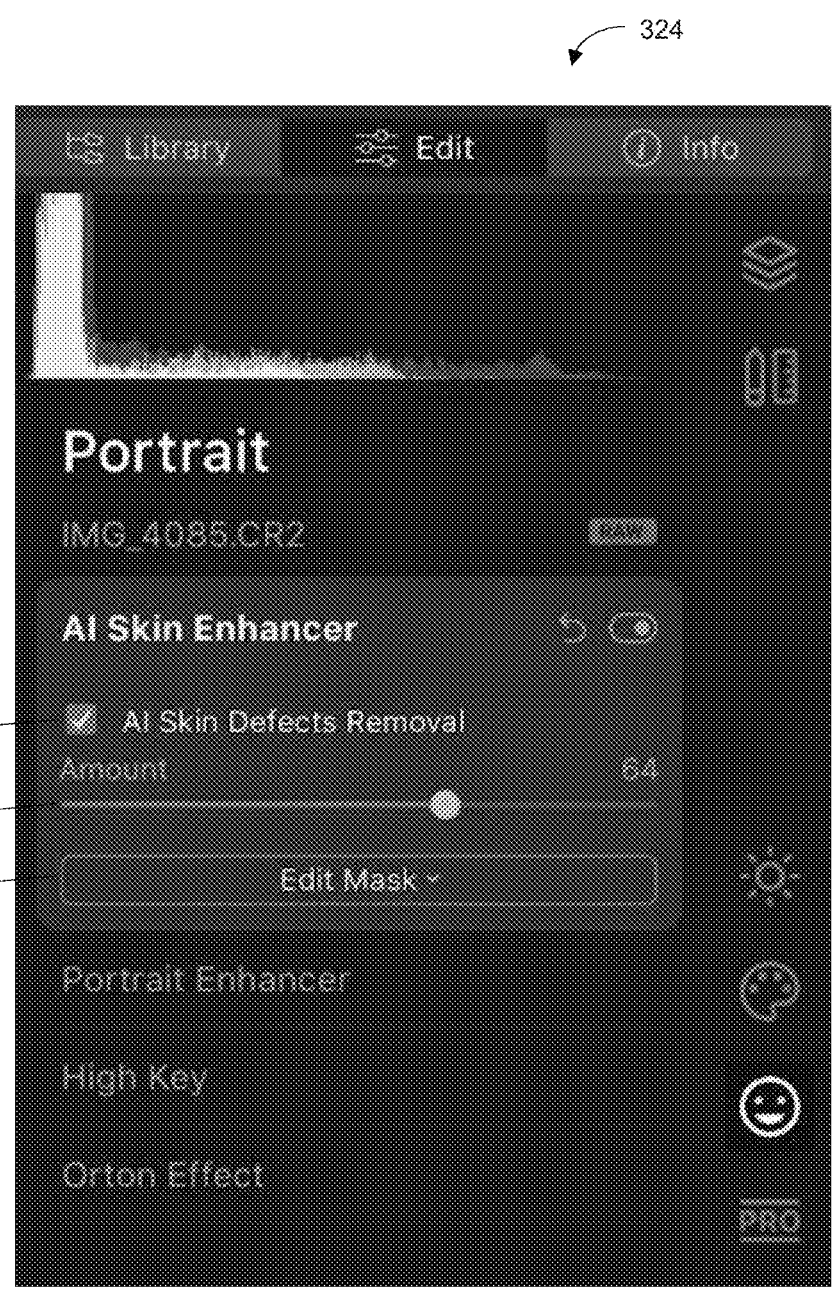
FIG. 33 is a detailed view of an adjustment section of a user interface in accordance with the present disclosure.

FIG. 33 is a screenshot illustrating a detailed view of the adjustment section 324. In some embodiments, the adjustment section 324 can include a single checkbox 326 to confirm whether skin defect removal is desired. In some embodiments, the adjustment section 324 can include a transparency value slider 328 for adjusting the strength or intensity of the skin enhancement effect on the final image. The checkbox 326 and slider 328 can be provided as separate or independent controls for customization of the enhancements. In some embodiments, the adjustment section 324 can include an edit mask section 330 for adjustment of the neural network mask generated by the system 100.

In some embodiments, after enhancements have been made to one image to create a final enhanced image, it may be desirable to automatically apply the same enhancements to one or more other input original images 170 in the system 100. The system 100 provides an efficient process for applying or copying the same enhancements to one or more input original images 170 without having to repeat the editing steps again. The user interface 114 includes the image selection section 320 (e.g., an image filmstrip in FIG. 32) or an image context menu (e.g., a gallery view) for viewing multiple edited and unedited images.

Figure 34:
FIG. 34 is an image context menu of a user interface in accordance with the present disclosure.
Figure 35:
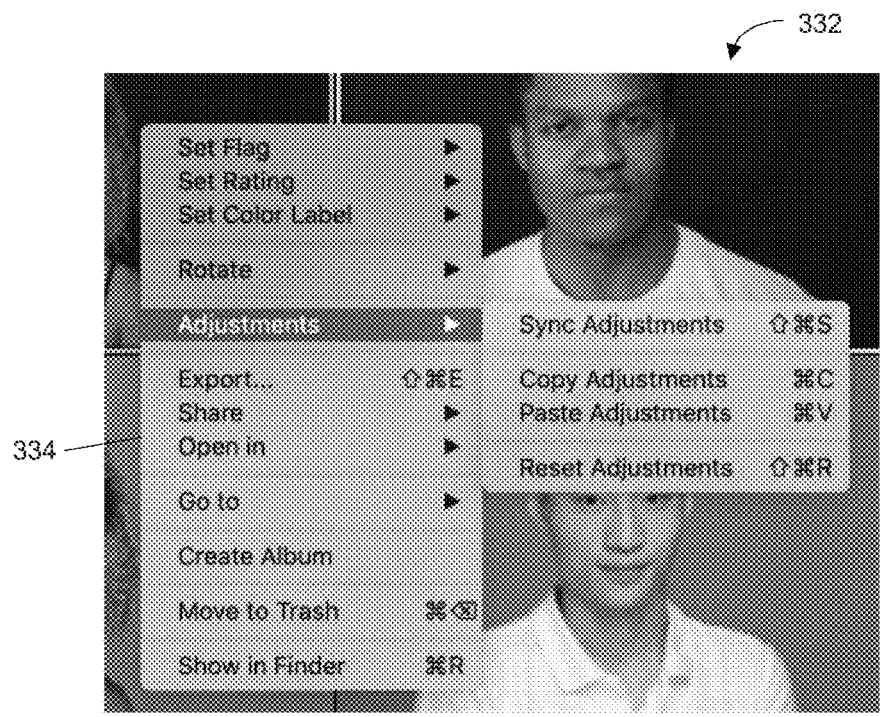
FIG. 35 is a detailed view of an image context menu of a user interface in accordance with the present disclosure.
Figure 36:
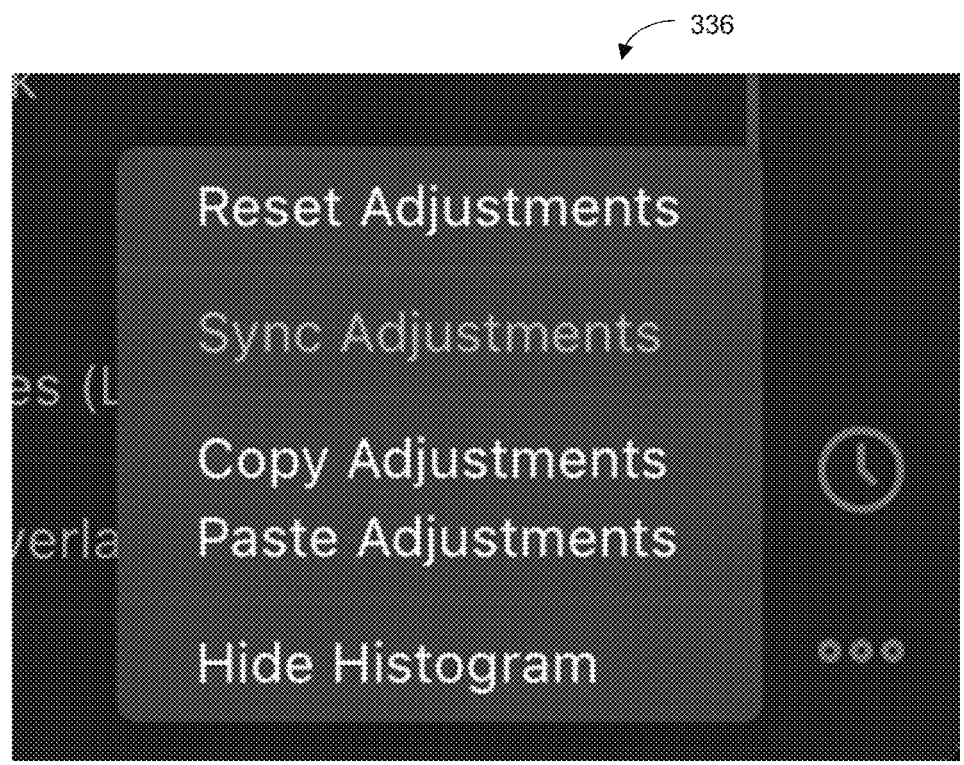
FIG. 36 is a detailed submenu of a user interface in accordance with the present disclosure.

FIG. 34 is a screenshot illustrating a view of an image context menu 332 and FIG. 35 is a screenshot illustrating a detailed view of the image context menu 332 of the user interface 114. The image context menu 332 of FIG. 34 includes a final enhanced image 198 with skin enhancements applied and multiple input original images 170 without skin enhancements. A submenu 334 can be selected by the user by right-clicking on the enhanced image 198, choosing adjustments, and copy adjustments to copy the enhancements of the enhanced image 198. Next, the user can select the input original images 170 in the image context menu 332 for which the same enhancements will be applied and, as shown in FIG. 36, right-clicking on the selected images 170 generates a submenu 336. The submenu 336 can be used to choose copy adjustments to apply or sync the same enhancements to the selected original images 170. It should be understood that the image selection section 320 of, e.g., FIG. 32, can be used in a similar manner. For example, the submenu 334 can be selected by right-clicking on the enhanced image 198 in the image selection section 320 to copy to applied enhancements, the desired original images 170 can be selected in the image selection section 320, and the submenu 336 can be used to apply or copy the same enhancements to the selected original images 170. The process of copying the enhancements to additional original images 170 in the system 100 can thereby be provided in an efficient and convenient manner.

Figure 37:
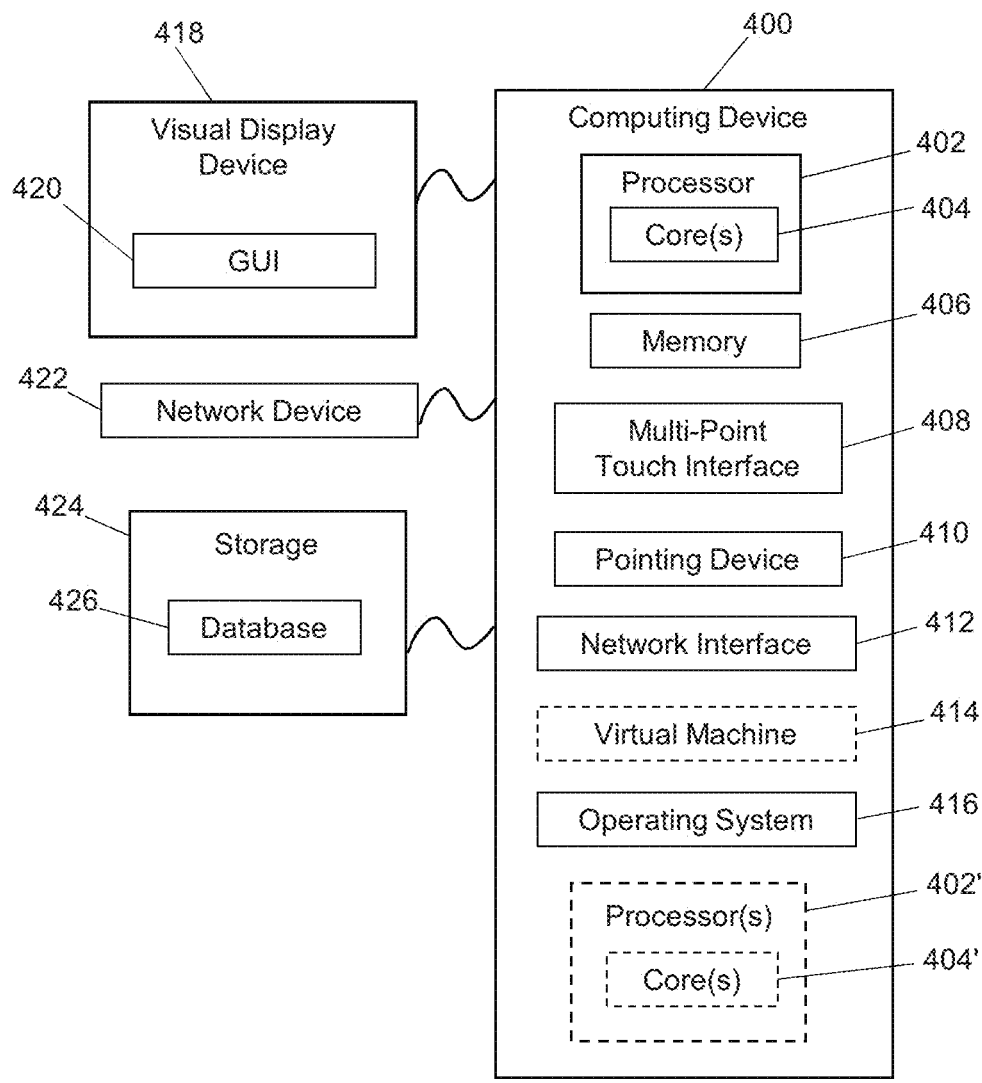
FIG. 37 is a block diagram of an exemplary computing device for implementing the exemplary system for selective enhancement of skin features in images in accordance with the present disclosure.

FIG. 37 is a block diagram of a computing device 400 (e.g., a mobile device, a smart device, a computer, or the like) in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for operating the camera, instructions for operating the modules, instructions for operating the database, instructions for operating the processing device, instructions for operating the communication interface, instructions for operating the user interface, instructions for operating the central computing system, instructions for operating the neural network, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor. Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display at least one user interface 420 (e.g., a graphical user interface) that may be provided in accordance with exemplary embodiments. The computing device 400 may include other I/O devices for receiving input from a user, for example, a camera, a keyboard, microphone, or any suitable multi-point touch interface 408, a pointing device 410 (e.g., a mouse), or the like. The input interface 408 and/or the pointing device 410 may be coupled to the visual display device 418. The computing device 400 may include other suitable conventional I/O peripherals.

The computing device 400 may also include at least one storage device 424, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the system described herein. Exemplary storage device 424 may also store at least one database 426 for storing any suitable information required to implement exemplary embodiments. For example, exemplary storage device 424 can store at least one database 426 for storing information, such as data relating to the cameras, the modules, the databases, the central computing system, the communication interface, the processing device, the neural networks, the user interface, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via at least one network device 422 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, a network interface card, a PCMCIA network card, Pa CI/PCIe network adapter, an SD adapter, a Bluetooth adapter, a card bus network adapter, a wireless network adapter, a USB network adapter, a modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 38:
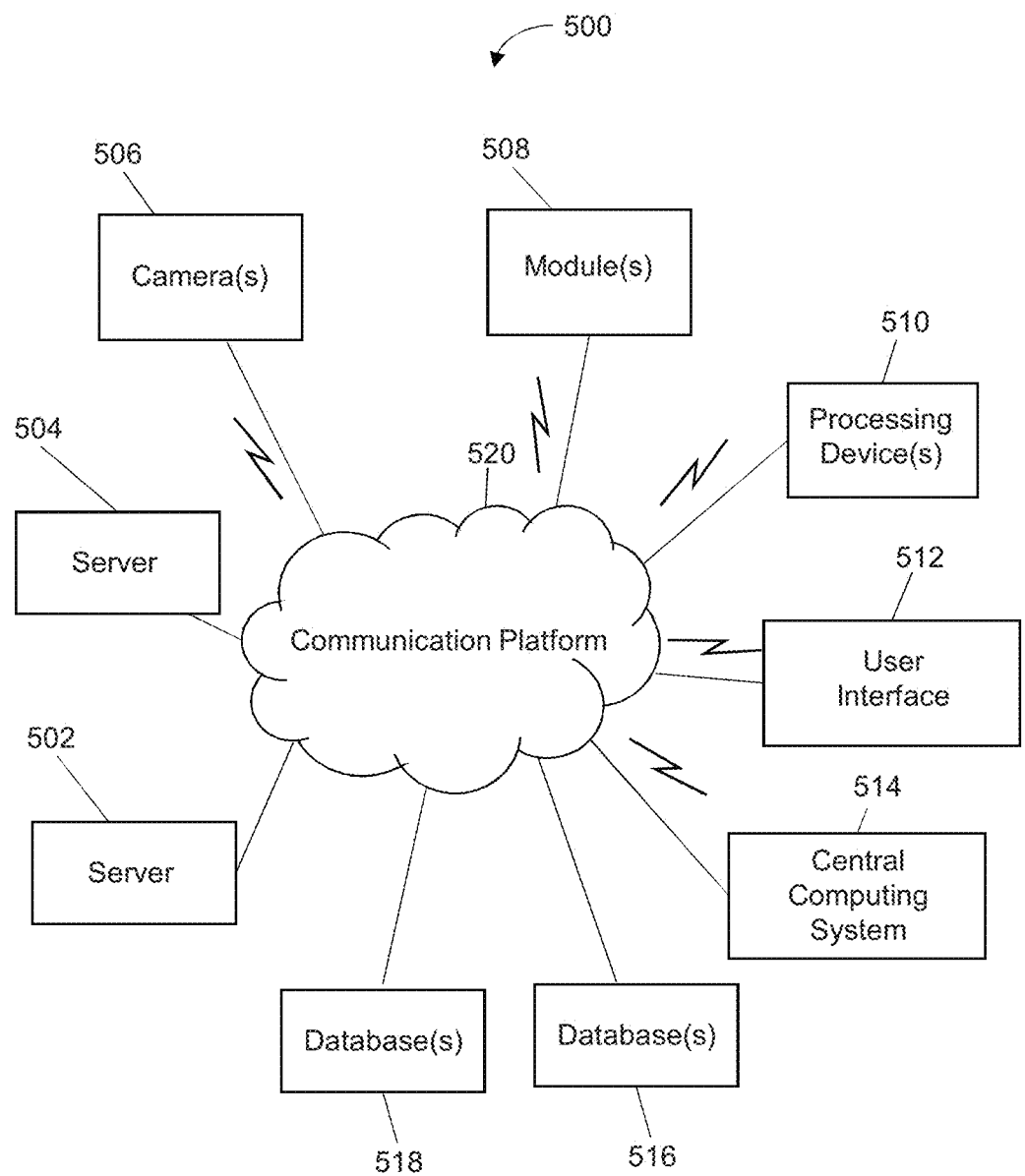
FIG. 38 is a block diagram of an exemplary system for selective enhancement of skin features in images environment in accordance with the present disclosure.

FIG. 38 is a block diagram of an exemplary system for selective enhancement of skin features in images environment 500 in accordance with exemplary embodiments of the present disclosure. The environment 500 can include servers 502, 504 configured to be in communication with one or more cameras 506, one or more modules 508, at least one processing device 510, a user interface 512, and a central computing system 514 via a communication platform 520, which can be any network over which information can be transmitted between devices communicatively coupled to the network. For example, the communication platform 520 can be the Internet, Intranet, virtual private network (VPN), wide area network (WAN), local area network (LAN), and the like. In some embodiments, the communication platform 520 can be part of a cloud environment.

The environment 500 can include repositories or databases 516, 518, which can be in communication with the servers 502, 504, as well as the one or more cameras 506, one or more modules 508, at least one processing device 510, a user interface 512, and a central computing system 514, via the communications platform 520. In exemplary embodiments, the servers 502, 504, one or more cameras 506, one or more modules 508, at least one processing device 510, a user interface 512, and a central computing system 514 can be implemented as computing devices (e.g., computing device 400). Those skilled in the art will recognize that the databases 516, 518 can be incorporated into at least one of the servers 502, 504. In some embodiments, the databases 516, 518 can store data relating to the database 104, and such data can be distributed over multiple databases 516, 518.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for selective enhancement of skin features in an image, the system comprising:
   an interface configured to receive as input an original image; and
   a processing device in communication with the interface, the processing device configured to:
   (i) process the original image using a neural network to detect one or more skin imperfections in the original image;
   (ii) generate a neural network mask of the original image for the one or more skin imperfections in the original image;
   (iii) generate one or more source patches based on the original image; and
   (iv) replace the one or more skin imperfections in the original image with the one or more source patches to generate a patched skin image;
   wherein the processing device is further configured to:
   generate a masked skin image including a skin mask; and
   generate a blurred image, the blurred image including blurring of the skin encompassed by the skin mask without affecting facial feature details.

2. The system of claim 1, wherein the original image includes at least one individual with the one or more skin imperfections on a face of the individual.

3. The system of claim 1, wherein the processing device generates a bounding box around detected skin features in the original image for enhancement, the skin features including the one or more skin imperfections.

4. The system of claim 3, wherein the processing device generates a separate bounding box for each individual depicted in the original image.

5. The system of claim 1, wherein the neural network mask is a skin imperfections mask, the skin imperfections mask including an island disposed over and associated with each of the one or more skin imperfections.

6. The system of claim 1, wherein the processing device generates a defect area independently surrounding each of the one or more skin imperfections.

7. The system of claim 6, wherein the processing device selects one of the one or more source patches for replacement of one of the one or more skin imperfections based on at least a partial overlap between the defect area and the source patch.

8. The system of claim 1, wherein the skin mask encompasses skin within the patched skin image and excludes facial feature details from the skin mask.

9. The system of claim 8, wherein the facial feature details include at least one of eyebrows, hair, nose, or lips.

10. The system of claim 1, wherein the processing device generates a detail image, the detail image including facial feature details excluded from the skin mask.

11. The system of claim 10, wherein the processing device generates two or more filtered images.

12. The system of claim 11, wherein the two or more filtered images include the facial feature details at different kernel sizes, wherein the different kernel sizes are small kernels, medium kernels, and big kernels.

13. The system of claim 12, wherein the processing device generates a combined image, the combined image including the facial feature details of the small kernels and including only some of the facial feature details of the medium and big kernels.

14. The system of claim 13, wherein the processing device generates a dark circle mask for shadowed features under eyes of the individual.

15. The system of claim 13, wherein the processing device generates a noise image, the noise image including a noise effect applied to skin of an individual with the one or more skin imperfections.

16. A system for selective enhancement of skin features in an image, the system comprising:
an interface configured to receive as input an original image; and
a processing device in communication with the interface, the processing device configured to:
(i) process the original image using a neural network to detect one or more skin imperfections in the original image;
(ii) generate a neural network mask of the original image for the one or more skin imperfections in the original image;
(iii) generate one or more source patches based on the original image; and
(iv) replace the one or more skin imperfections in the original image with the one or more source patches to generate a patched skin image;
wherein:
the interface includes an image selection section with the patched skin image and one or more additional original images; and
the interface includes a first submenu for selecting the patched skin image and copying one or more enhancements applied to the patched skin image, and the interface includes a second submenu for selecting one or more of the additional original images and applying the copied one or more enhancements of the patched skin image to the selected one or more of the additional original images.

* * * * *